(12) United States Patent
Tanaka et al.

(10) Patent No.: US 8,949,300 B2
(45) Date of Patent: Feb. 3, 2015

(54) CIRCUIT AND METHOD FOR CONTROLLING QUALITY OF RANDOM NUMBERS

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1146 days.

(21) Appl. No.: 11/621,872

(22) Filed: Jan. 10, 2007

(65) Prior Publication Data

US 2008/0052577 A1    Feb. 28, 2008

(30) Foreign Application Priority Data

Jan. 11, 2006    (JP) .................................. 2006-003203

(51) Int. Cl.
| G06F 1/02 | (2006.01) |
| G06F 7/58 | (2006.01) |
| H04K 1/00 | (2006.01) |
| H04L 9/08 | (2006.01) |

(52) U.S. Cl.
CPC ............ H04L 9/0852 (2013.01); H04L 9/0838 (2013.01); G06F 7/58 (2013.01)
USPC ............................ 708/255; 708/250; 380/256

(58) Field of Classification Search
USPC ................... 708/3, 250–256; 380/255–263
See application file for complete search history.

(56) References Cited

U.S. PATENT DOCUMENTS

| 4,853,884 A * | 8/1989 | Brown et al. ..................... 708/3 |
| 5,987,483 A * | 11/1999 | Edelkind et al. ............... 708/250 |
| 6,185,669 B1 * | 2/2001 | Hsu et al. ....................... 712/205 |
| 6,218,657 B1 * | 4/2001 | Bethune et al. ........... 250/214 R |
| 6,415,309 B1 * | 7/2002 | Shilton .......................... 708/250 |
| 6,430,170 B1 * | 8/2002 | Saints et al. .................. 370/335 |
| 6,697,829 B1 * | 2/2004 | Shilton .......................... 708/255 |
| 6,801,626 B1 * | 10/2004 | Nambu .......................... 380/256 |
| 6,993,543 B2 * | 1/2006 | Hars .............................. 708/250 |
| 7,080,106 B2 * | 7/2006 | Ikeda et al. ................... 708/250 |

(Continued)

FOREIGN PATENT DOCUMENTS

| JP | 2004-264097 A | 9/2004 |
| WO | 2005086409 A1 | 9/2005 |

OTHER PUBLICATIONS

Bethune et al., "An Autocompensating Figer-Optic Qunatum Cryptography System Based on Polarization Splitting of Light", IEEE Journal of Quantum Electronics, vol. 36, No. 3, Mar. 2000, pp. 340-347.*

(Continued)

*Primary Examiner* — Chat Do
*Assistant Examiner* — Matthew Sandifer
(74) *Attorney, Agent, or Firm* — Sughrue Mion, PLLC

(57) ABSTRACT

A random number quality control circuit capable of fast control of the level of random number quality is present. When a "0" output section and a "1" output section generate random numbers by individually receiving a random number signal, a random number quality monitor monitors an unbalance between the numbers of "0"s and "1"s. If a deviation from a desired ratio is found, a drive controller controls the reception characteristics of the "0" output section and "1" output section individually so that the deviation will be compensated for. The amount of information intercepted between a sender and a receiver can be reduced by maintaining the mark ratio of shared random numbers at 50%.

33 Claims, 24 Drawing Sheets

(56) References Cited

U.S. PATENT DOCUMENTS

| | | | |
|---|---|---|---|
| 7,197,523 B2* | 3/2007 | Lutkenhaus et al. | 708/255 |
| 7,284,024 B1* | 10/2007 | Trifonov et al. | 708/3 |
| 7,428,562 B2* | 9/2008 | Beausoleil et al. | 708/255 |
| 7,472,148 B2* | 12/2008 | Simon et al. | 708/250 |
| 7,647,366 B2* | 1/2010 | Meintrup et al. | 708/250 |
| 7,706,536 B2* | 4/2010 | Dinu et al. | 380/256 |
| 7,720,228 B2* | 5/2010 | Zavriyev et al. | 380/263 |
| 7,831,048 B2* | 11/2010 | Kastella et al. | 380/256 |
| 2001/0038695 A1 | 11/2001 | Kim | |
| 2002/0097874 A1* | 7/2002 | Foden et al. | 380/256 |
| 2003/0131031 A1* | 7/2003 | Klass | 708/250 |
| 2005/0238173 A1* | 10/2005 | Vig | 380/277 |
| 2007/0116286 A1* | 5/2007 | Yuan et al. | 380/256 |
| 2008/0144823 A1* | 6/2008 | Abe et al. | 380/256 |
| 2010/0111305 A1* | 5/2010 | Yuan et al. | 380/256 |

OTHER PUBLICATIONS

X. Sun and F. M. Davidson, "Photon counting with silicon avalanche photodiodes," J. Lightw. Technol., vol. 10, pp. 1023-1032, Aug. 1992.*

P. Wang, G. Long, and Y. Li, "Scheme for a quantum random number generator," J. Appl. Phys. 100, 056107, 2006.*

A. Stefanov, N. Gisin, O. Guinnard, L. Guinnard, and H. Zbinden, "Optical quantum random number generator," J. Mod. Opt. 47, pp. 595-598, 2000.*

Charles H. Bennett et al. "Quantum Cryptography: Public Key Distribution and Coin Tossing" IEEE International Conference on Computers, Systems and Signal Processing, Bangalore, India, Dec. 10-12, 1984, pp. 175-179.

Norbert Lutkenhaus "Estimates for Practical Quantum cryptography", Physical Review A, vol. 59, No. 5, May 1999, pp. 3301-3319.

Mark Williamson et al. "Eavesdropping on Practical Quantum Cryptography", Quantum-ph/0211155 v1, Nov. 24, 2002 pp. 1-13.

Antonio Acin et al. "Coherent-Pulse Implementations of Quantum Cryptography Protocols Resistant to Photon-Number-Splitting Attacks", Physical Review A, No. 69, 012309 (2004).

Nicolas Gisin et al. "Quantum Cryptography", Reviews of Modern Physics, No. 74, pp. 145-195.

Donald S. Bethune et al. "An Autocompensating Fiber-Optic Quantum Cryptography System Based on Polarization Splitting of Light", IEEE Journal of Quantum Electronics, vol. 36, No. 3 (Mar. 2000) pp. 340-347.

Akisha Tomita et al. "Balanced, gated-mode Photon Detector for Quantum-Bit Discrimination at 1550 nm", Optical Society of America. Oct. 15, 2002, vol. 27, No. 20, pp. 1827-1829.

Jan Soubusta et al., "Quantum Random Number Generator", Proceedings of SPIE, Jan. 1, 2001, p. 54-60, vol. 4356.

Japanese Office Action issued on Jul. 27, 2011 in the corresponding Japanese Patent Application No. 2006-003203.

* cited by examiner

FIG. 5 (RELATED ART)

| BASIS | DATA | OUTPUT APD |
|---|---|---|
| + | 0 | 0 |
|   | 1 | 1 |

| BASIS | DATA | OUTPUT APD |
|---|---|---|
| × | 0 | 1 |
|   | 1 | 0 |

PROBABILITY P1 OF DETECTING "0" WITH + BASIS : (PROBABILITY S1 OF GENERATING "0" WITH +) × (DETECTION EFFICIENCY Q0 OF APD0)
PROBABILITY P2 OF DETECTING "1" WITH + BASIS : (PROBABILITY S2 OF GENERATING "1" WITH +) × (DETECTION EFFICIENCY Q1 OF APD1)
PROBABILITY P3 OF DETECTING "0" WITH × BASIS : (PROBABILITY S3 OF GENERATING "0" WITH ×) × (DETECTION EFFICIENCY Q1 OF APD1)
PROBABILITY P4 OF DETECTING "1" WITH × BASIS : (PROBABILITY S4 OF GENERATING "1" WITH ×) × (DETECTION EFFICIENCY Q0 OF APD0)

⇒

PROBABILITY OF DETECTING "0" = P1+P3 = S1×Q0+S3×Q1
PROBABILITY OF DETECTING "1" = P2+P4 = S2×Q1+S4×Q0

⇒ IF S1=S2=S3=S4, THEN

PROBABILITY OF DETECTING "0" = P1+P3 = S1×(Q0+Q1) ⎤
PROBABILITY OF DETECTING "1" = P2+P4 = S1×(Q1+Q0) ⎦ EQUAL

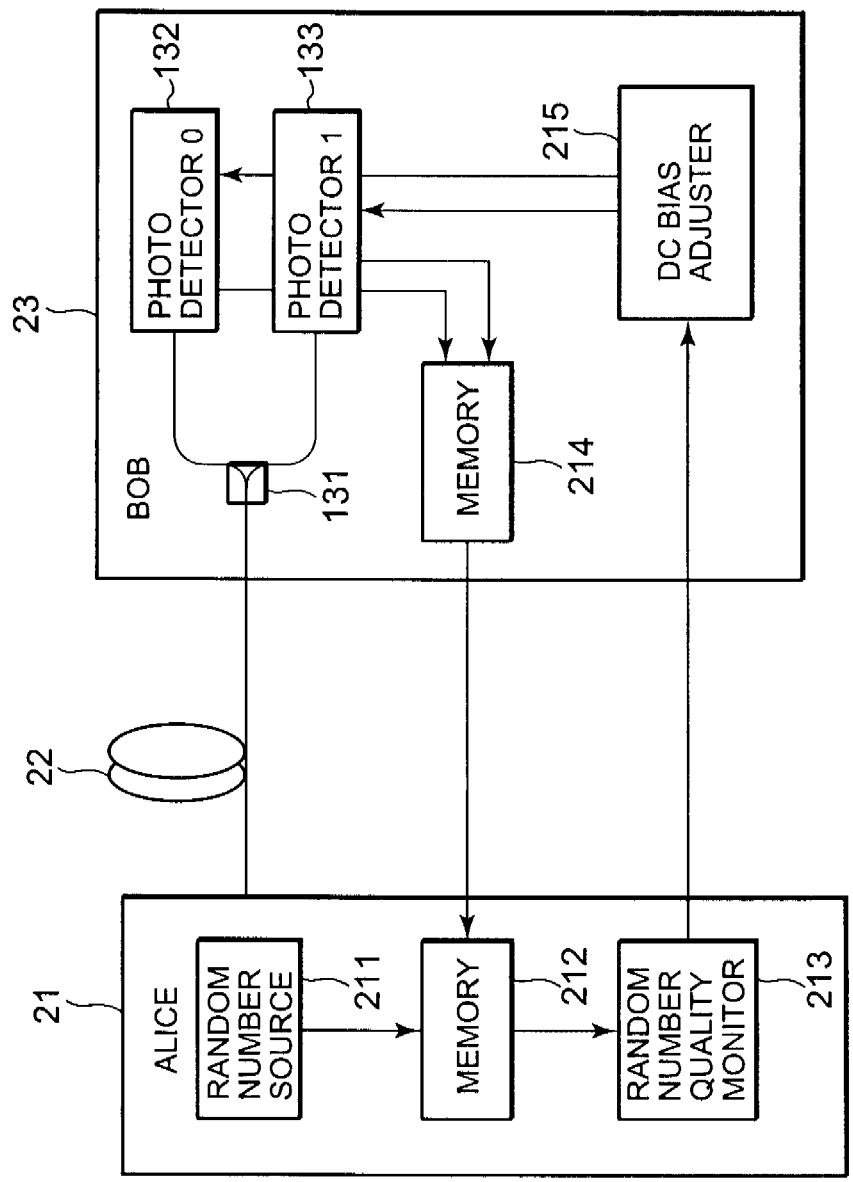

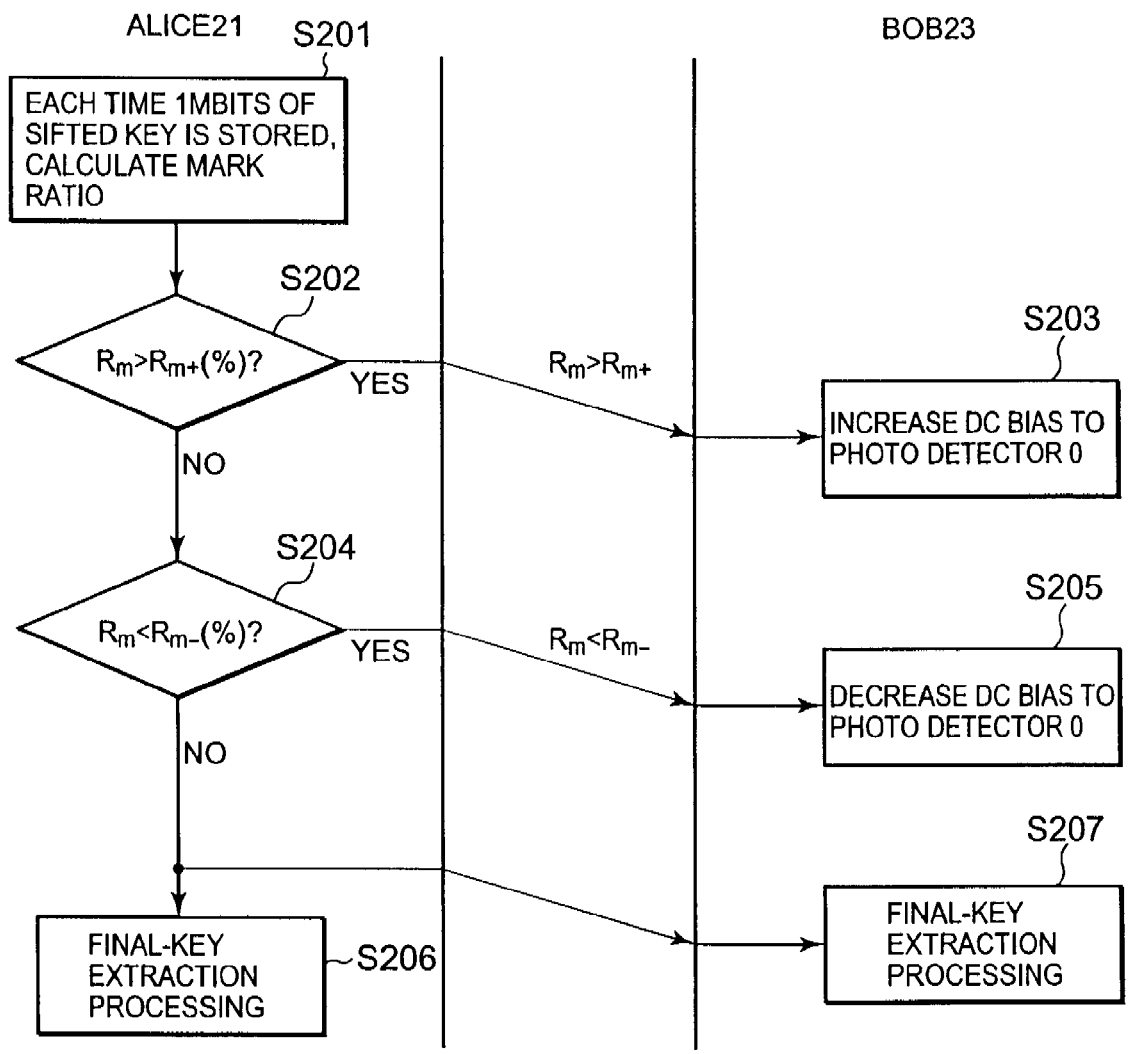

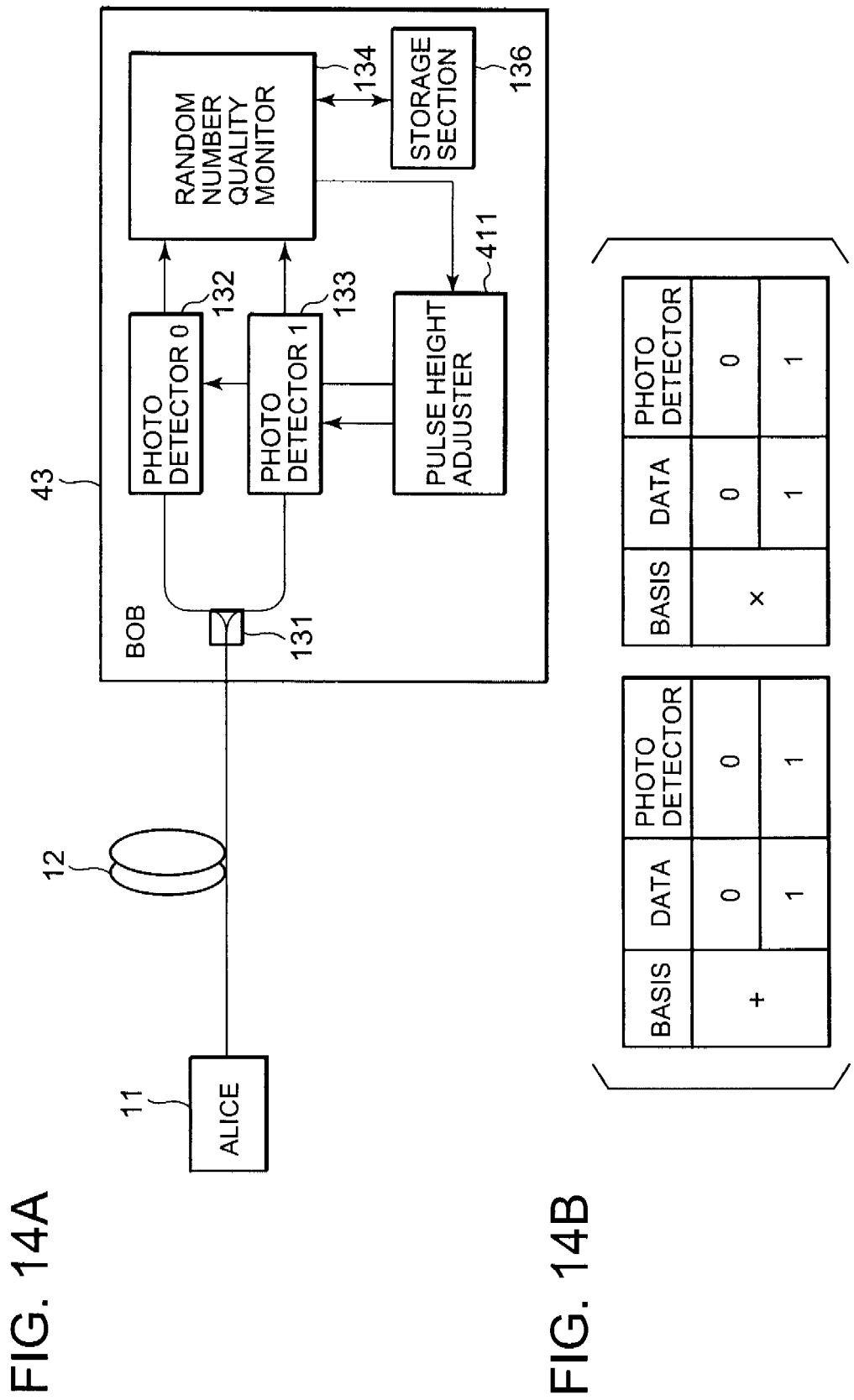

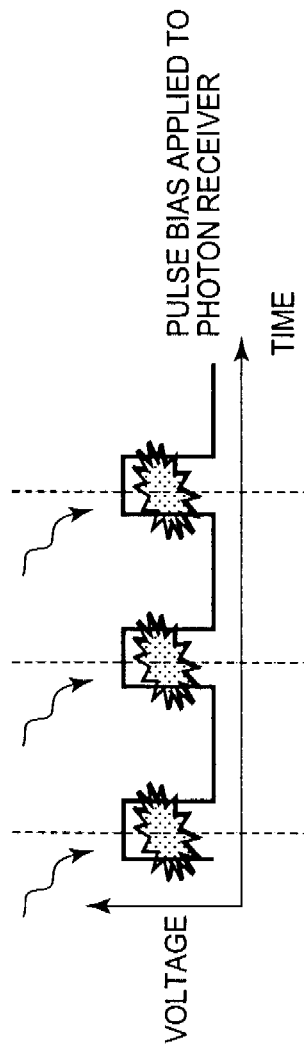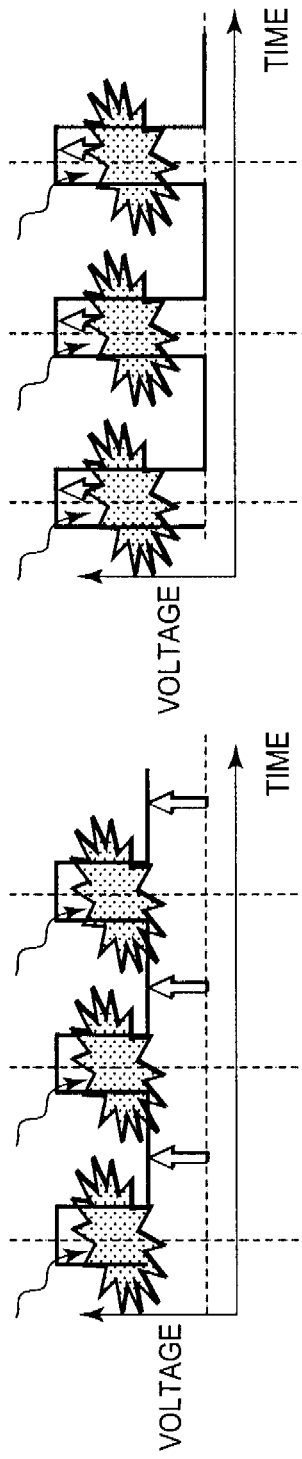

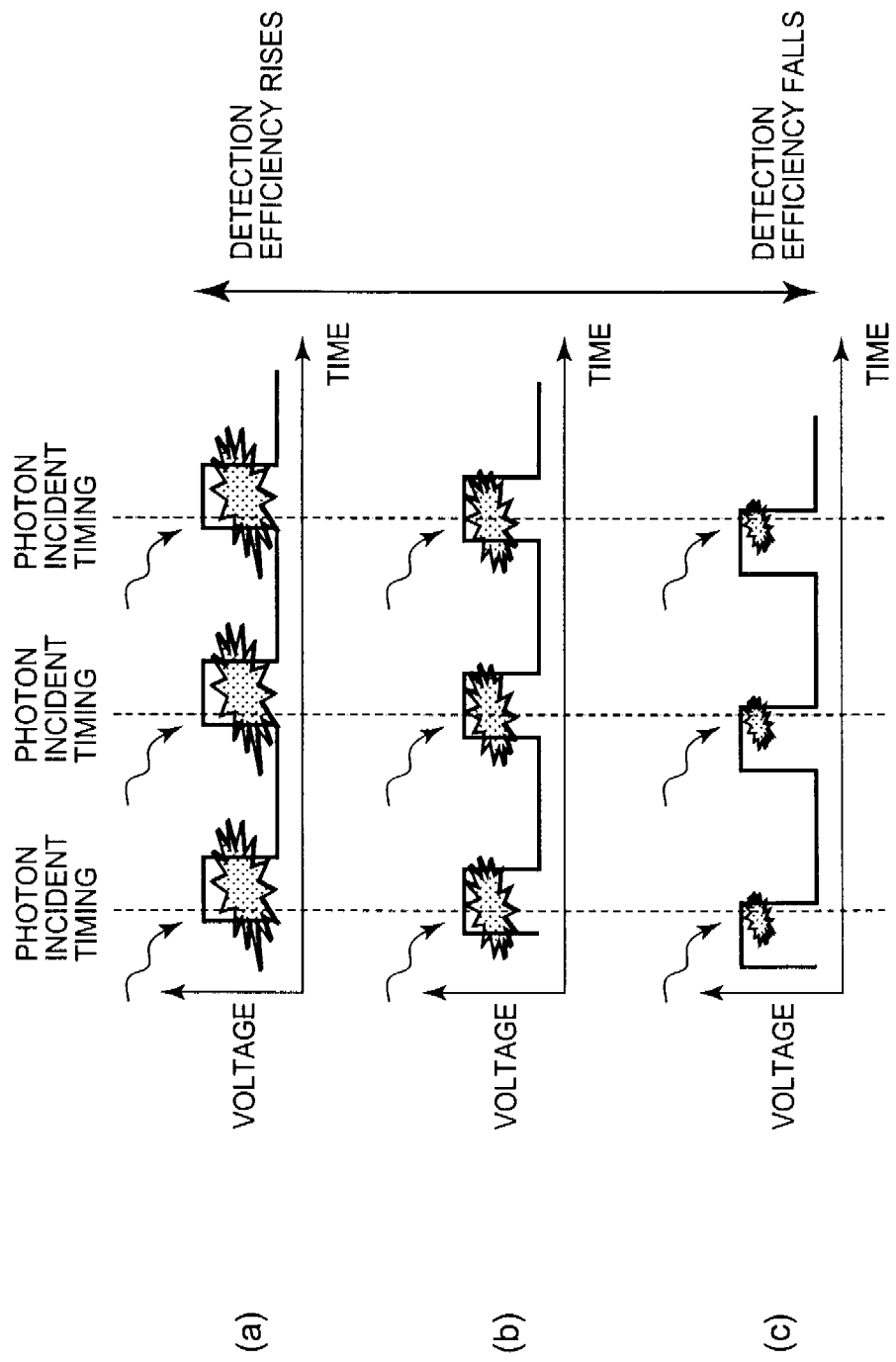

CIRCUIT AND METHOD FOR CONTROLLING QUALITY OF RANDOM NUMBERS

BACKGROUND OF THE INVENTION

1. Field of the Invention

The present invention relates to techniques of generating random numbers and, more particularly, to a circuit and a method for controlling the quality of random numbers.

2. Description of the Related Art

The internet, which continues growing rapidly, is convenient on one hand, but its security is quite uncertain on the other hand. There is an ever increasing need for highly advanced cryptographic technologies for maintaining the secrecy of communications. Cryptographic schemes currently used in general can be classified into two categories: secret-key cryptography such as DES (Data Encryption Standard) and triple DES, and public-key cryptography such as RSA (Rivest Shamir Adieman) and ECC (Elliptic Curve Cryptography). However, these are cryptographic communication methods that ensure the security of communications based on the "complexity of computation" and are always fraught with the danger that ciphertext could be broken with the advent of an algorithm enabling a vast amount of computation or a cryptanalysis algorithm. With such a background, quantum key distribution (QKD) systems receive attention as the cryptographic key distribution technologies that are "absolutely immune against eavesdropping."

In QKD, a photon is generally used as a communication medium, and transmission is performed by superposing information on the quantum state (such as polarization and phase) of a photon. According to the Heisenberg's uncertainty principle, it is impossible to perfectly return the quantum state of a photon once observed to its original state before observation. Therefore, if an eavesdropper present on a transmission line intercepts the information by tapping photons being transmitted or by any other methods, a change occurs in the statistic values of received data detected by an authorized receiver. By monitoring this change, the receiver can detect the presence of an eavesdropper on the transmission line.

In the case of a quantum key distribution method utilizing the phase of a photon, a sender and a receiver (hereinafter, referred to as "Alice" and "Bob" respectively, as have been used traditionally) constitute an optical interferometer, and Alice and Bob individually perform random phase modulation on each of single photons. Depending on a difference between the depths of these phase modulations, an output can be obtained by a photon receiver 0 or another photon receiver 1 on Bob's side. Thereafter, Alice and Bob check part of the respective conditions they used in measurement of the output data against each other, whereby the same bit string can be shared between Alice and Bob ultimately. Hereinafter, brief description will be given of one of the most typical quantum key distribution algorithms, called BB84 protocol, which is described in Bennett and Brassard, "Quantum Cryptography: Public Key Distribution and Coin Tossing", IEEE International Conference on Computers, Systems and Signal Processing (Bangalore, India, Dec. 10-12, 1984), pp. 175-.

FIG. 1 is a schematic diagram showing a concept of a quantum key distribution method according to the BB84 protocol. Here, it is assumed that Alice (sender) 191 and Bob (receiver) 193 are connected through an optical transmission line 192. According to this method, Alice 191 has two random number sources, one of which provides random numbers 1 representing cryptographic key data (0/1), and the other one of which provides random numbers 2 for determining the way of coding the information of the random number 1. In the case of utilizing the phase of a photon, a random number 2 determines a selection from two bases, which correspond to two coding sets: a coding set of phases of 0 and $\pi$ representing "0" and "1" in the cryptographic key, respectively (hereinafter, this set will be referred to as "+ basis"); and a coding set of phases of $\pi/2$ and $3\pi/2$ representing "0" and "1" in the cryptographic key, respectively (hereinafter, this set will be referred to as "× basis"). That is, any one of the four types of modulation (0, $\pi/2$, $\pi$, $3\pi/2$) is randomly given to each of single photons, which are then sent to Bob one by one.

On the other hand, Bob has a random number source (random number 3) for the bases and uses the random numbers 3 to decode the single photons sent from Alice. When the value of a random number 3 is "0", 0-phase (+ basis) modulation is performed on a photon. When the value of a random number 3 is "1", $\pi/2$-phase (× basis) modulation is performed on a photon. Here, a random number obtained as an output of the optical interferometer is referred to as a random number 4.

When a basis Alice used in modulation is the same as a basis Bob used in modulation (random number 2=random number 3), Bob can correctly detect the value of a random number 1 (random number 1=random number 4). When a basis Alice used in modulation is different from a basis Bob used in modulation (random number 2≠random number 3), Bob randomly obtains a value "0" or "1" as a random number 4, independently of the value of a random number 1. Since each of the random numbers 1, 2 and 3 is a random number varying bit by bit, the probability that a basis match occurs and the probability that no basis match occurs are both 50%. However, since those bits corresponding to non-matching bases are removed through basis reconciliation at a subsequent stage, Alice and Bob can share a bit string composed of 0s and 1s corresponding to the random numbers 1.

FIG. 2 is a flowchart showing a flow of quantum key generation in general. Among original random numbers for a cryptographic key sent from Alice, most amount of the information is lost through quantum key distribution (single-photon transmission) S181. A key shared between Alice and Bob at this stage is called a raw key. After basis reconciliation S182, an obtained cryptographic key that has lost approximately one half the amount of information, is called a sifted key. Thereafter, error correction S183 is carried out to correct errors that have arisen in the key at the stage of quantum key distribution, followed by privacy amplification S184 for eliminating the amount of information that conceivably has been leaked to an eavesdropper. Then, the remains are made to be a final key, which will be actually used as a cryptographic key. As for a logic to estimate the amount of information that conceivably has been leaked to an eavesdropper, many a document is known to mention it, such as N. Lutkenhaus, "Estimates for practical quantum cryptography", Physical Review A, Vol. 59, No. 5 (May 1999), pp. 3301—(hereinafter, this document will be referred to as Lutkenhaus), and M. Williamson and V. Vedral, "Eavesdropping on practical quantum cryptography", quantum-ph/0211155 v1 (24 Nov. 2002) (hereinafter, this document will be referred to as Williamson).

FIG. 3 is a diagram for describing a privacy amplification scheme in general. First, a sifted key is divided into N-bit subsequences, and a matrix multiplication of a M-by-N random number matrix with each N-bit subsequence is performed, thus obtaining M-bit (N>M) subsequences, which are the products of this multiplication, as a final key. Here, the relationship between M bits and N bits is determined depending on the amount of information conceivably leaked to an eavesdropper, Eve. The amount of leaked information can be calculated based on the error rate of the sifted key, by a method described in Lutkenhaus or Williamson. For example, when the amount of leaked information can be estimated at 40% of the whole amount of information, it is set that M/N=1−0.4=0.6.

However, in a quantum key distribution system, in actuality, only part of a sent bit sequence arrives at the receiving side. Therefore, even if the proportions of "0"s and "1"s in the sent random numbers are precisely 50% each, the proportions of "0"s and "1"s in the received bit sequence deviate from 50%. Therefore, if a sifted key is generated based on a raw key in which the proportions of "0"s and "1"s deviate from 50%, the proportions of "0"s and "1"s in the sifted key also deviate. Hereinafter, it is assumed that a mark ratio Rm is the ratio of the number of numbers with one of the values included in random numbers to the total number of the random numbers. In the case of random numbers composed of "0"s and "1"s, the following is defined: mark ratio Rm=(the number of "1"s in a sequence of the random numbers)/(the length of the sequence of the random numbers).

In the case where the mark ratio Rm of a sifted key deviates from 50%, Eve can obtain a larger amount of information by using a simple method (mark ratio eavesdropping strategy) as follows.

Eve eavesdrops on communications performed by Alice and Bob to calculate the error rate of a sifted key, thereby obtaining knowledge about the mark ratio of the sifted key.

When the mark ratio is 50% or greater, Eve allows a cryptographic key of her own (hereinafter, referred to as false sifted key) to be all "1"s. When the mark ratio is smaller than 50%, Eve allows it to be all "0"s.

According to this operation, the probability that Eve's false sifted key matches the sifted key shared between Alice and Bob becomes higher as the mark ratio of the sifted key deviates further from 50%. By way of example, when the mark ratio of a sifted key is 60%, there are 60 bits of "1"s and 40 bits of "0"s in the 100-bit sifted key, probabilistically. In this case, since the bits in the Eve's false sifted key are all "1"s, 60 bits of the 100 bits make matches, with the error ratio of the false sifted key to the sifted key being 40%. It is known that the Shannon information S can be expressed by the following equation:

$$S=1+E\log_2 E+(1-E)\log_2(1-E)$$

where E is the error ratio. Therefore, when the error ratio E is 40%, the Shannon information is approximately 0.03. Accordingly, of the 100 bits, information equivalent to 3 bits is leaked to Eve.

FIG. 4A is a graph showing the amount of information obtained by Eve through the mark ratio eavesdropping strategy, varying with the mark ratio of a sifted key. FIG. 4B is a part of the graph of FIG. 4A, enlarged around a mark ratio of 50%. When the mark ratio is 50%, the probability that the false sifted key matches the sifted key is 50% even if Eve allows the 100 bits in the false sifted key to be all "0"s or all "1"s (or allows "0"s and "1"s to coexist in the key with a ratio of 50% to 50%). That is to say, the error ratio is also 50%, and Eve's amount of information (S) is zero.

On the other hand, as an extreme example, when the mark ratio is 100% (or 0%), all the bits in the sifted key are "1"s (or "0"s). Therefore, Eve can correctly presume all the bits, and Eve's amount of information (S) is one.

As described above, Eve carries out eavesdropping on quantum key distribution (single-photon transmission) by using any of the eavesdropping strategies considered in Lutkenhaus and Williamson and other eavesdropping strategies such as those described in A. Acin et al., "Coherent-pulse implementations of quantum cryptography protocols resistant to photon-number-splitting attacks", Physical Review A, No. 69, 012309 (2004), and N. Gisin et al., "Quantum cryptography", Reviews of Modern Physics, No. 74, pp. 145-195. Eve can obtain more bit information by additionally applying the above-described mark ratio eavesdropping strategy to the bits on which Eve could not obtain information, that is, the bits about which Eve could not determine whether bit information is "0" or "1".

However, if the above-mentioned process of privacy amplification is ideal, it is possible to maintain the safety of a final key, even if the mark ratio of a sifted key deviates from 50% as described above. Nonetheless, if an attempt to actually secure the safety is made, Alice and Bob must discard a large amount of information in the process of privacy amplification, resulting in the cryptographic key generation rate being degraded.

As is apparent from the graph of FIG. 4B, Eve's amount of information immediately rises where the mark ratio deviates from 50%. Therefore, in quantum key distribution, it is preferable that the mark ratio of random numbers before entering the process of privacy amplification be strictly 50%. For the methods by which the mark ratio of random numbers is made to be 50%, the following methods are known.

(1) Von Neumann Unbiasing Method

The Von Neumann unbiasing method is known as a general method for having the mark ratio of random numbers be 50%. According to this method, input random numbers are divided into 2-bit subsequences, among which a subsequence of "00" and a subsequence of "11" are discarded, and a subsequence of "01" and a subsequence of "10" are replaced with new numbers of "0" and "1", respectively. Thereby, even if the mark ratio of the random numbers before the process deviates from 50%, the mark ratio of the random numbers after the process can be made to be 50%. However, according to this method, the quantity of outputs is one fourths or smaller the quantity of input random numbers. Therefore, in the case of using this method particularly in quantum key distribution, the cryptographic key generation rate is significantly degraded.

(2) Method Utilizing the Characteristics of Four-Value Signal

The major cause of the deviation of the mark ratio of a sifted key from 50% lies in a photon receiver. Therefore, it is conceivable that a mark ratio of 50% could be maintained by adjusting the photon receiver.

Specifically, the following method can also be adopted, according to the description in D. S. Bethune and W. P. Risk, "An Autocompensating Fiber-Optic Quantum Cryptography System Based on Polarization Splitting of Light", IEEE Journal of Quantum Electronics, Vol. 36, No. 3 (March 2000) (hereinafter, this document will be referred to as Bethune). That is, the mark ratio of a cryptographic key can also be made closer to 50% by adding some refinement to the method of coding the four quantum states according to BB84, which is one of the most common protocols for quantum key distribution.

FIG. 5 is a diagram showing an outline of a mark ratio improving method based on the description in Bethune. As described above by using FIG. 1, coding is performed such that a signal will be outputted to a photon receiver 0 when "0" is sent by using the + basis, a signal will be outputted to a photon receiver 1 when "1" is sent by using the + basis, a signal will be outputted to the photon receiver 1 when "0" is sent by using the × basis, and a signal will be outputted to the photon receiver 0 when "1" is sent by using the × basis. Here, the probability of detecting each of the four quantum states can be represented as follows:

$P1$(probability of detecting "0" with + basis)=$S1$
(probability of generating "0" with + basis)*$Q0$;

$P2$(probability of detecting "1" with + basis)=$S2$
(probability of generating "1" with + basis)*$Q1$;

$P3$(probability of detecting "0" with × basis)=$S3$
(probability of generating "0" with × basis)*$Q1$;

and $P4$(probability of detecting "1" with × basis)=$S4$
(probability of generating "1" with × basis)*$Q0$, where Q0 and Q1 are the detection efficiencies of the photon receivers 0 and 1, respectively. Here, assuming that S1 to S4 are strictly equal to each other (S1=S2=S3=S4), then (probability of obtaining "0")=$P1+P3=S1*Q0+S3*Q1=(Q0+Q1)*S1$, and (probability of obtaining "1")=$P2+P4=S2*Q1+S4*Q0=(Q0+Q1)*S1$.

Accordingly, it can be confirmed that the numbers of "0"s and "1"s in obtained random numbers are equal to each other.

However, even if the probabilities of generating the respective states (S1 to S4) are set equal to each other, they cannot be equal in actuality at the time of generating a signal, due to temporal variations in device driving conditions. Specifically, S1 to S4 are not equal to each other due to variations in the number of photons caused by a voltage noise in a light source, variations in the purity of the individual states caused by fluctuations in the voltage for driving a phase modulator, and the like. If S1 to S4 are not equal to each other, the mark ratio of generated random numbers deviates from 50%, with a need for mark ratio compensation newly arising. Specifically, to pass NIST SP800-22 as a random number test for measuring the quality of random numbers, for example, the mark ratio of 1-Mbit random numbers needs to be approximately 50%±0.13%.

Incidentally, in conventional ordinary optical communications, the light intensity is high, and communications are carried out with the error ratio of a sent signal within a range of $1*10^{-3}$ or smaller. Therefore, a sent signal almost certainly matches a received signal. Even if the mark ratio of the sent signal differs from that of the received signal, the difference is of the order of $10^{-3}$ or smaller. Moreover, in the first place, such a harm that the amount of information an eavesdropper can obtain will increase if the mark ratios of the sent and received signals are different is not envisaged in the conventional optical communications. Accordingly, the presence of an eavesdropper and eavesdropping activities are not supposed. Therefore, the problem related to the mark ratio could not have arisen.

On the other hand, in a system where the sharing of secret information is performed by using very weak light at a single-photon level, the relationship between the quality of shared random numbers and the security is an important issue as described above.

SUMMARY OF THE INVENTION

Therefore, an object of the present invention is to provide a random number control circuit and method that can control the level of quality of given random numbers.

Another object of the present invention is to provide a random number control circuit and method that can control the quality of random numbers shared between communication devices, without degrading the random number generation rate.

According to an aspect of the present invention, a random-number quality control circuit includes: an output section for separately outputting the plurality of values from the random numbers; a calculating section for calculating a proportion of count of each of the plurality of values; and a controller for controlling an output characteristic of the output section so as to bring the proportion closer to a desired value. The output section may discriminate the plurality of values from the random numbers or detect the plurality of values to output detection signals of the respective values.

According to another aspect of the present invention, a random-number quality control system is provided in a communication system including a first communication device and a second communication device connected to each other through a transmission line. The random-number quality control system includes: a random-number quality monitor for monitoring the quality of random numbers, which are shared between the first and second communication devices based on a random-number signal transmitted from the first communication device to the second communication device; and a controller for changing reception characteristic of a receiver of the second communication device based on the monitored quality of the random numbers. The controller may control reception efficiency of a receiver of the second communication device or control a threshold used to discriminate a received signal.

Preferably, the reception characteristic of the receiver is controlled so as to make respective proportions of counts of the plurality of values equal to each other. In the case of random numbers with two values: "0" and "1" the reception characteristic is controlled so as to bring the respective numbers of 0s and 1s equal to each other, that is, mark ratio=50%. In addition, it is possible to combine the above-described method with another method of adjusting unbalanced statuses of a signal transmitted from a transmitter side based on the monitored quality of random numbers.

As an embodiment, the present invention may be applied to a quantum key distribution system. In this embodiment, the mark ratio of a generated sifted key is monitored and, when its mark ratio falls out of a permissible range around a desired value (e.g. 50%), the reception characteristic of the receiver (Bob) is adjusted to compensate for such unbalanced mark ratio, causing the mark ratio of the sifted key to be closer to 50%.

According to the present invention, respective characteristics for outputting the plurality of values are controlled so that the proportion, in number, of each of the plurality of values will be brought closer to a desired value. Accordingly, it is possible to promptly set the quality of random numbers to a desired level. In particular, the respective proportions of the plurality of values can be made uniform easily. For example, in a system in which a random number is generated based on a random-number signal received by a receiver, an unbalance between the numbers of "0"s and "1"s is monitored, and when a deviation from a desired value occurs, the reception characteristics of the receiver are controlled so that the deviation will be compensated for. As described above, by changing the reception characteristics of a receiver, it is possible to obtain random numbers of desired quality at high speed.

Specifically, the mark ratio of a sifted key shared in quantum key distribution can be maintained at 50%. The reason is that a deviation between the numbers of "0"s and "1"s due to an unbalance between the received numbers can be compensated for by monitoring the mark ratio of a generated sifted key and giving feedback on the result of this monitoring to the detection efficiency of a photo-detecting element.

If the proportions, in number, of the plurality of values included in random numbers are made uniform as described above, the amount of information that could be leaked to an eavesdropper can be reduced in shared random numbers (such as a cryptographic key) that should be secret. This is because the mark ratio of a cryptographic key to be subjected to privacy amplification in a quantum key generation process can be also maintained at 50%, which prevents an eavesdropper from being able to estimate a final key. In addition, since the mark ratio can be set at a desired value by controlling the reception characteristics of a receiver, the shared information generation rate is not degraded.

BRIEF DESCRIPTION OF THE DRAWINGS

FIG. 5 is a diagram showing an outline of a mark ratio improving method based on the description in Bethune.

FIG. 10 is a block diagram showing a schematic configuration of a quantum key distribution system to which a random number quality control circuit according to a second embodiment of the present invention is applied.

FIG. 11 is a flowchart showing DC bias control according to the second embodiment.

FIG. 14A is a block diagram showing a schematic configuration of a quantum key distribution system to which a random number quality control circuit according to a fourth embodiment of the present invention is applied.

FIG. 14B is a table showing the operations of an optical circuit in the fourth embodiment.

FIG. 15A is a diagram of voltage waveforms in the gated Geiger mode, in which pulse bias is applied to a photon receiver at a timing of the arrival of a photon.

FIG. 15B is a diagram of voltage waveforms, corresponding to the first embodiment, when the DC bias value of the pulse bias is increased.

FIG. 15C is a diagram of voltage waveforms when the pulse height of the pulse bias is increased.

FIG. 18 is a diagram of voltage waveforms for describing a relationship between pulse bias application timing and detection efficiency.

DETAILED DESCRIPTION OF THE PREFERRED EMBODIMENTS

According to the present invention, m values of m-value random numbers are discriminated, and the respective proportions of counts for the m values, $P_1$, to $P_m$, are used as an index of the quality of the random numbers. For example, random numbers in which the m values have the same proportions ($P_1=P_2=\ldots=P_m$) can be regarded as having desirable quality. In the case of binary (two-value) random numbers composed of a sequence of "x"s and "y"s, the quality thereof can be evaluated with a mark ratio Rm=(number of "x"s in the sequence of random numbers)/(length of the sequence of random numbers), as described above. Hereinafter, by way of example, the case of binary random numbers in which x=1 and y=0 will be shown using the mark ratio Rm.

Figure 1:
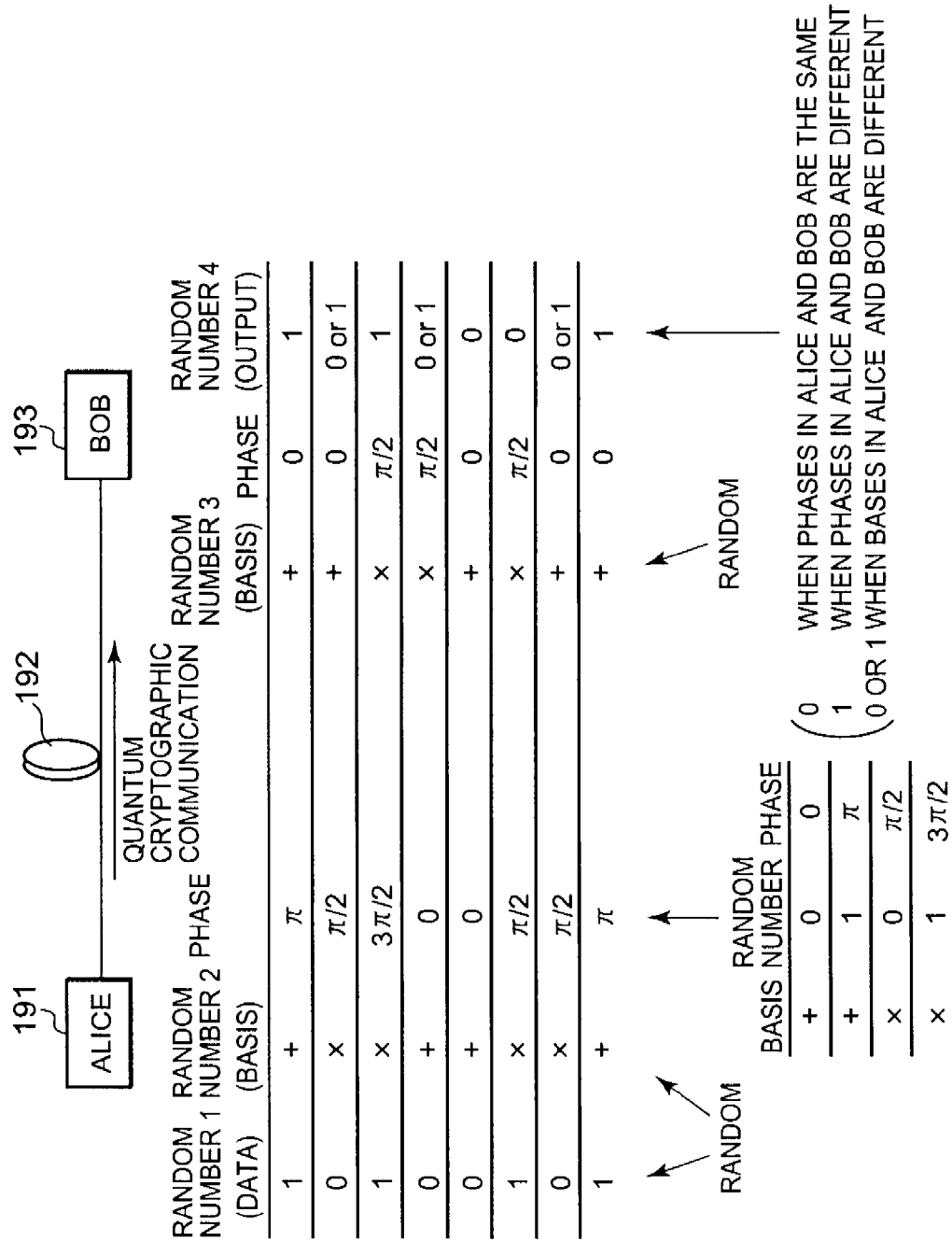
FIG. 1 is a schematic diagram showing a concept of a quantum key distribution method according to the BB84 protocol.
Figure 2:
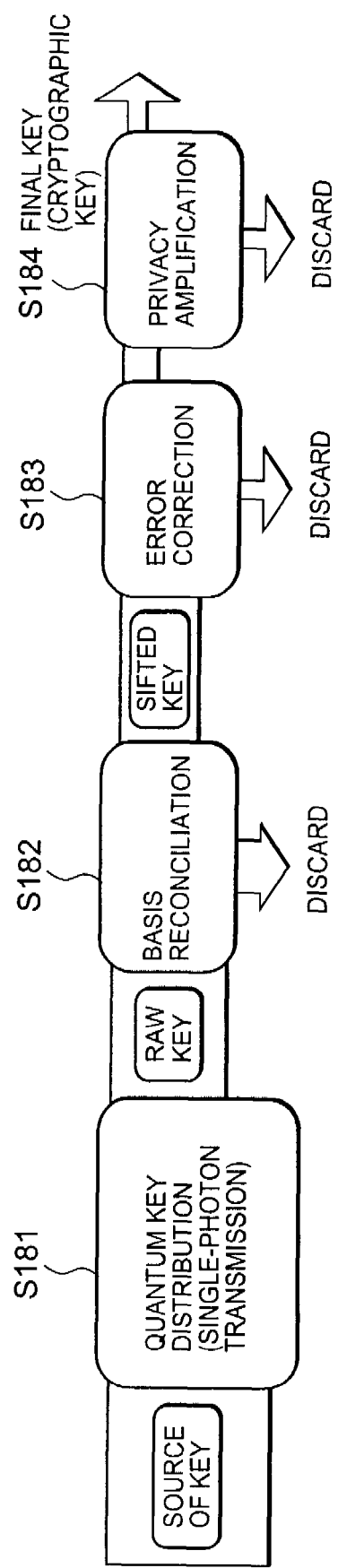
FIG. 2 is a flowchart showing a flow of quantum key generation in general.
Figure 3:
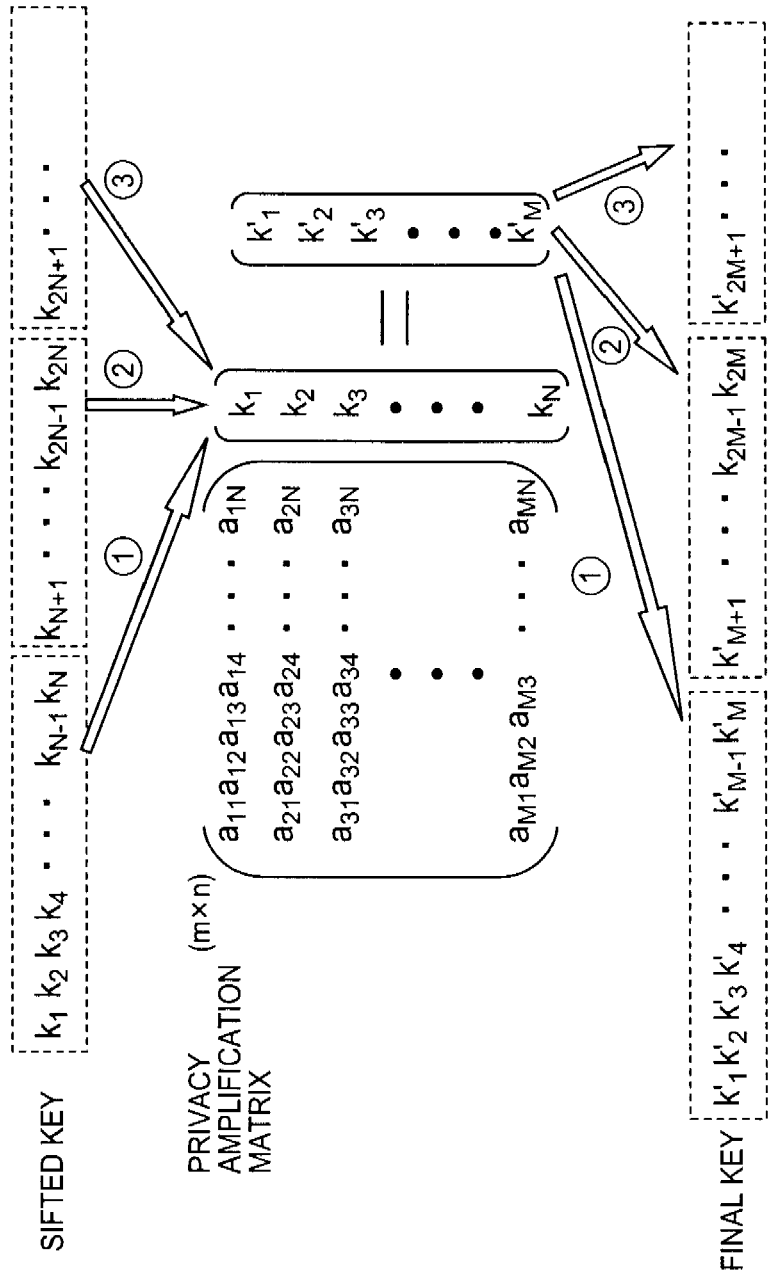
FIG. 3 is a diagram for describing a privacy amplification scheme in general.
Figure 4A:
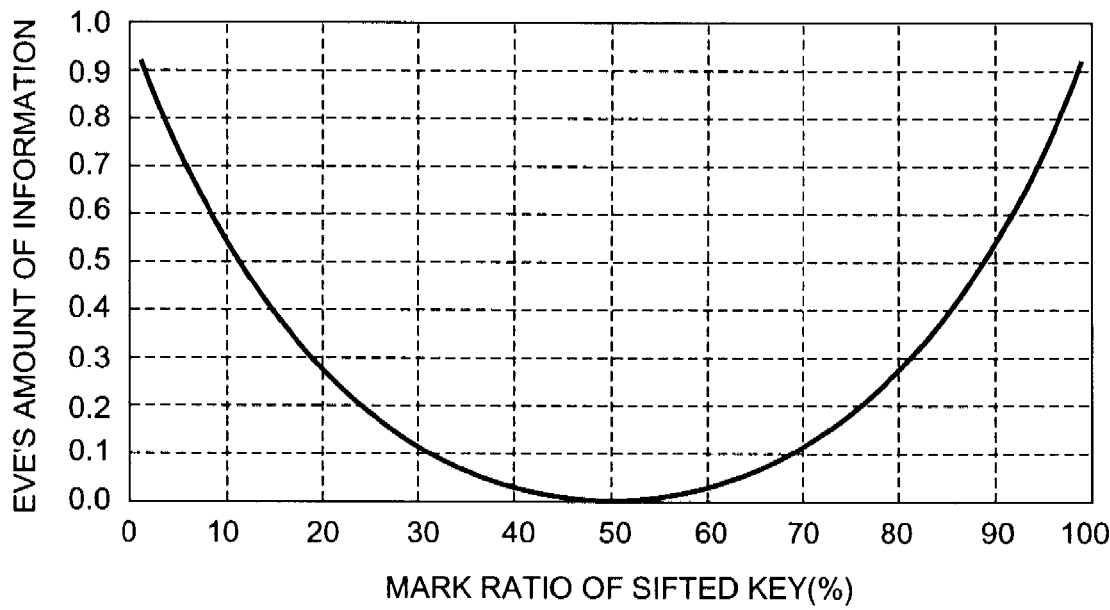
FIG. 4A is a graph showing the amount of information obtained by Eve through a mark ratio eavesdropping strategy, varying with the mark ratio of a sifted key.
Figure 4B:
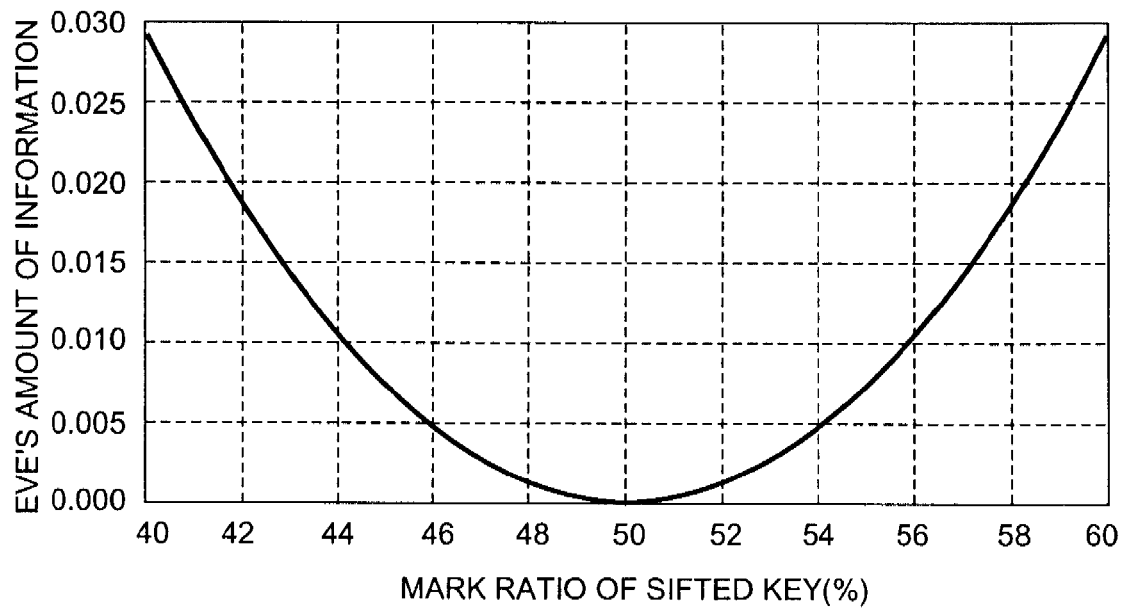
FIG. 4B is a part of the graph of FIG. 4A, enlarged around a mark ratio of 50%.
Figure 6:
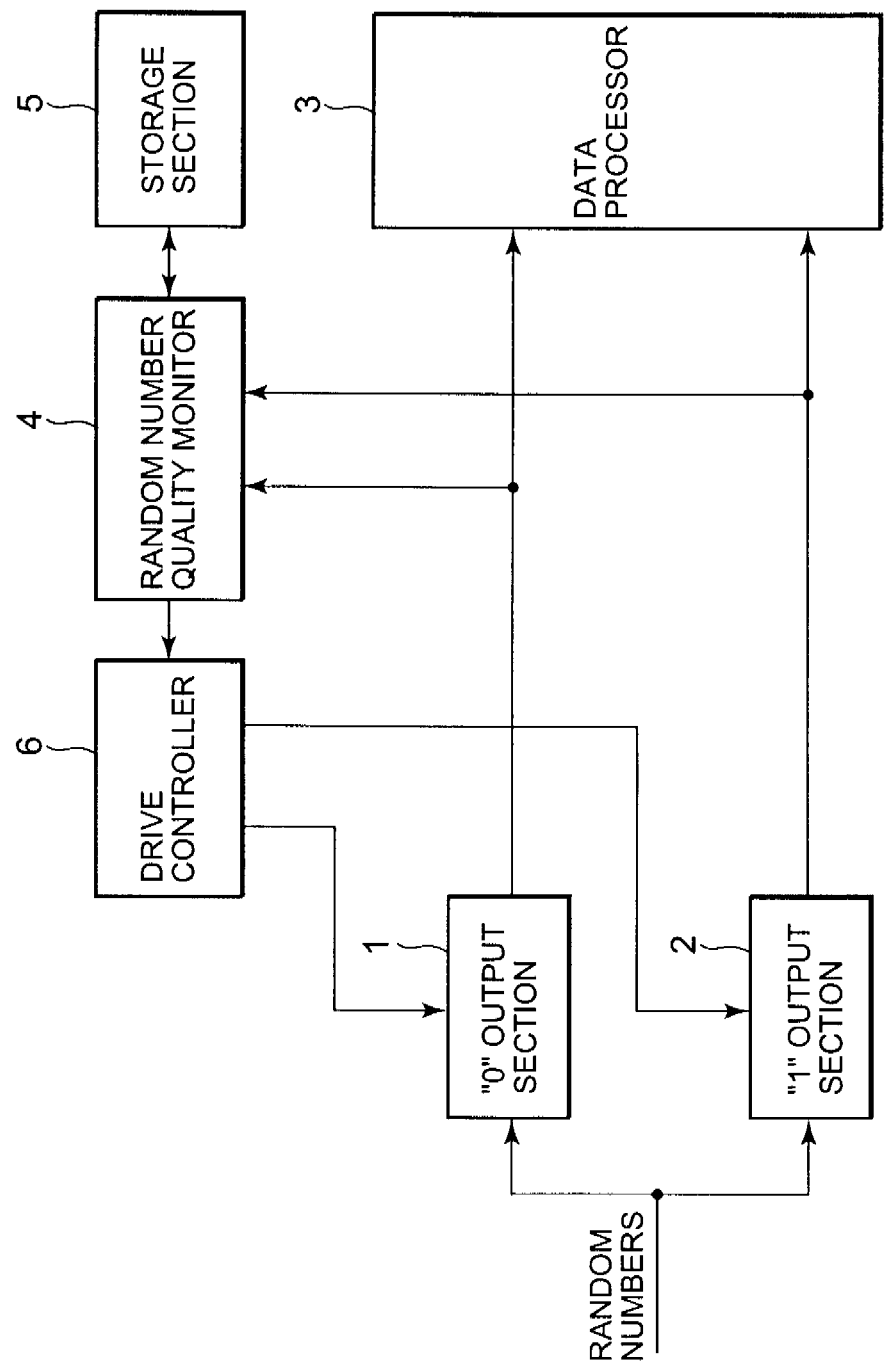
FIG. 6 is a block diagram showing a functional configuration of a random number quality control circuit according to a mode of the present invention.

FIG. 6 is a block diagram showing a functional configuration of a random number quality control circuit according to a mode of the present invention. The random number control circuit according to the present mode is provided with two output sections. One of the output sections is a "0" output section 1, which detects and outputs one of the values of input random numbers, "0". The other one is a "1" output section 2, which detects and outputs the other value of the input random numbers, "1". Alternatively, such a configuration may also be made that a detection signal is outputted each time "0" or "1" is inputted, by using, in place of the "0" output section 1 and "1" output section 2, a 0/1 discrimination section which discriminates between "0" and "1" in the input random numbers. Still alternatively, each of the "0" output section 1 and "1"

output section 2 may have a function of counting the number of its corresponding values (0s or 1s) each time the output section detects "0" or "1".

The values "0" and "1" sequentially outputted from the "0" output section 1 and "1" output section 2 are outputted to each of a data processor 3 and a random number quality monitor 4. The random number quality monitor 4 stores "0"s outputted from the "0" output section 1 and "1"s outputted from the "1" output section 2 in a storage section 5 until the total number of these outputs reaches a certain number. The mark ratio Rm, mentioned earlier, is calculated from the number of "0"s and the number of "1"s thus stored. In this event, it may be determined whether or not the mark ratio Rm is within a desired range (for example, 50%±δ%).

A drive controller 6 determines whether or not the mark ratio Rm is within a desired range (for example, 50%±δ%), or receives as input this determination result from the random number quality monitor 4. If the mark ratio Rm is out of the desired range, the drive controller 6 adjusts the numbers of "0"s and "1"s outputted from the output sections 1 and 2 respectively so that the mark ratio Rm will fall within the desired range.

Based on the mark ratio Rm, the drive controller 6 controls each of the "0" output section 1 and "1" output section 2 independently of the other. Any devices can apply to the "0" output section 1 and "1" output section 2 as long as they can relatively control the 0/1 output characteristics by using some method. It suffices that the devices can change the ratio between the output numbers of "0"s and "1"s by varying for the output sections bias voltage, driving voltage, threshold voltage, voltage application timing, or the like, specific examples of which will be given later.

As described above, according to this mode, the mark ratio Rm of the output random numbers can be adjusted into the desired range. Therefore, it is possible for the data processor 3 to make the mark ratio Rm of, for example, a cryptographic key generated in a cryptographic key generation process, as close to 50% as possible, based on the "0" sequence inputted from the "0" output section 1 and the "1"sequence inputted from the "1" output section 2. In the case of random numbers with a plurality of values, it suffices to make a configuration in which a plurality of output sections each corresponding to the plurality of values are provided, and respective output values are outputted to the random number quality monitor 4 and counted individually. Hereinafter, embodiments of the present invention will be described in detail.

First Embodiment

Figures 7A, 7B:
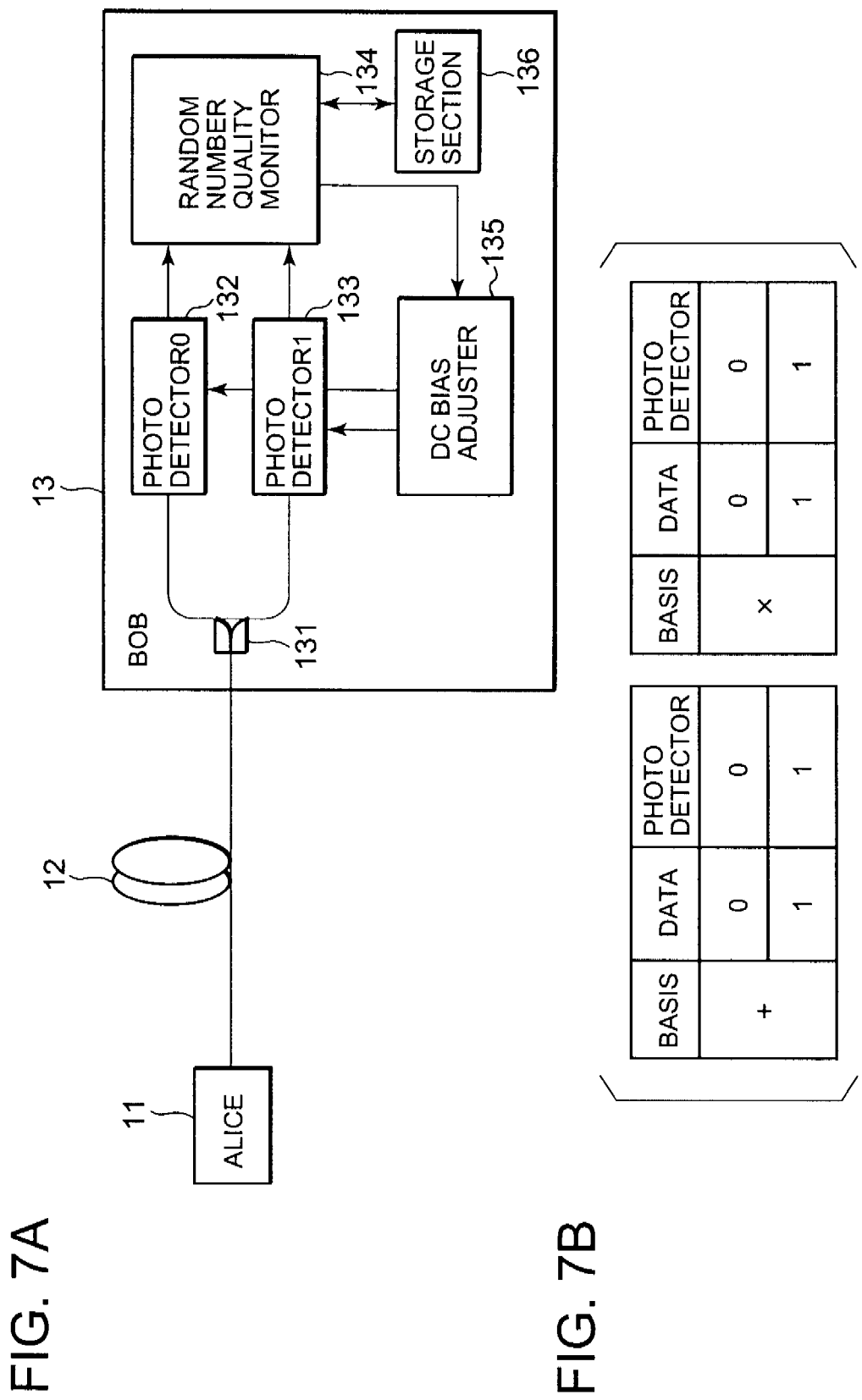
FIG. 7A is a block diagram showing a schematic configuration of a quantum key distribution system to which a random number quality control circuit according to a first embodiment of the present invention is applied.
FIG. 7B is a table showing the operations of an optical circuit in the first embodiment.

FIG. 7A is a block diagram showing a schematic configuration of a quantum key distribution system to which a random number quality control circuit according to a first embodiment of the present invention is applied. FIG. 7B is a table showing the operations of an optical circuit in the first embodiment. In the present embodiment, the detection efficiency η of a photon receiver, which is a reception efficiency of a receiver, is adjusted with DC bias so that the mark ratio of a sifted key is maintained at 50%.

Referring to FIG. 7A, in the quantum key distribution system according to the first embodiment, Alice (sender) 11 and Bob (receiver) 13 are connected through an optical fiber 12 and share a cryptographic key by superposing information on the phase of a photon to be transmitted. It is assumed that a photon enters any one of a photodetector 132 (hereinafter, referred to as photodetector 0) and a photodetector 133 (hereinafter, referred to as photodetector 1) depending on an interference at an optical coupler 131 in Bob 13. Here, an optical circuitry is such that an optical pulse is detected by the photodetector 0 when random number data "0" is sent, and an optical pulse is detected by the photodetector 1 when random number data "1" is sent, regardless of a transmission basis used on Alice's side.

Bob 13 is further provided with a random number quality monitor 134 receiving as input a detection output from each of the photodetectors 0 and 1, a storage section 136 used by the random number quality monitor 134, and a DC bias adjuster 135 for changing DC bias voltage to be applied to each of the photodetectors 0 and 1. As described above, the random number quality monitor 134 calculates the mark ratio Rm of shared random numbers, from the outputs of each of the photodetectors 0 and 1. The DC bias adjuster 135 changes the DC bias to each of the photodetectors 0 and 1, based on the calculated mark ratio Rm.

The photodetectors 0 and 1 are typically avalanche photodiodes (APDs) and, when detecting very weak light at a single-photon level, are driven in a Geiger mode in which a bias voltage equal to or more than the breakdown voltage is applied in general. In the Geiger mode, an unstable balance state is created by applying a high bias voltage exceeding the breakdown voltage to an APD, whereby a large current can be obtained even with an incidence of minute energy. For the Geiger mode, there are two types of Geiger modes: a continuous mode in which a high bias voltage is continuously applied from the incidence of a photon until the occurrence of a pulse current; and a gated Geiger mode in which a high bias voltage is applied in a pulse-like form intentionally at a photon incident timing. The present embodiment shows a case where the APDs are used in the gated Geiger mode.

Figure 8A:
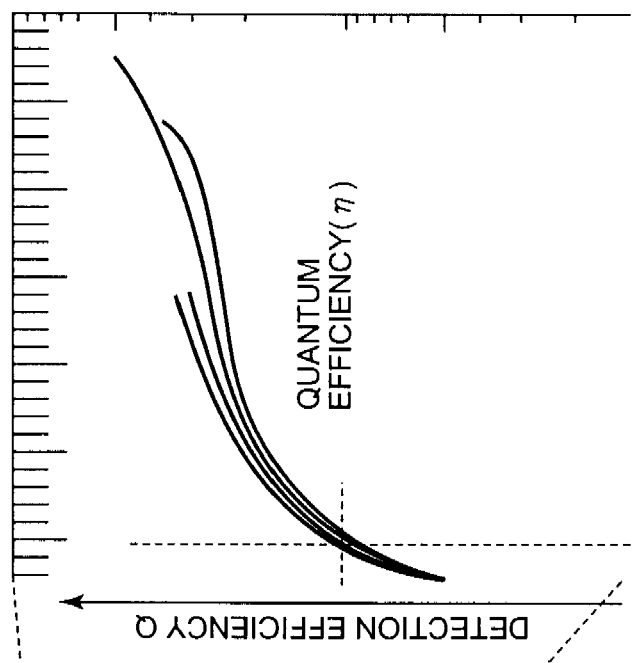
FIG. 8A is a graph showing an example of the relationship between DC bias applied to an APD and detection efficiency in the case of the APD being driven in the gated Geiger mode.
Figure 8B:
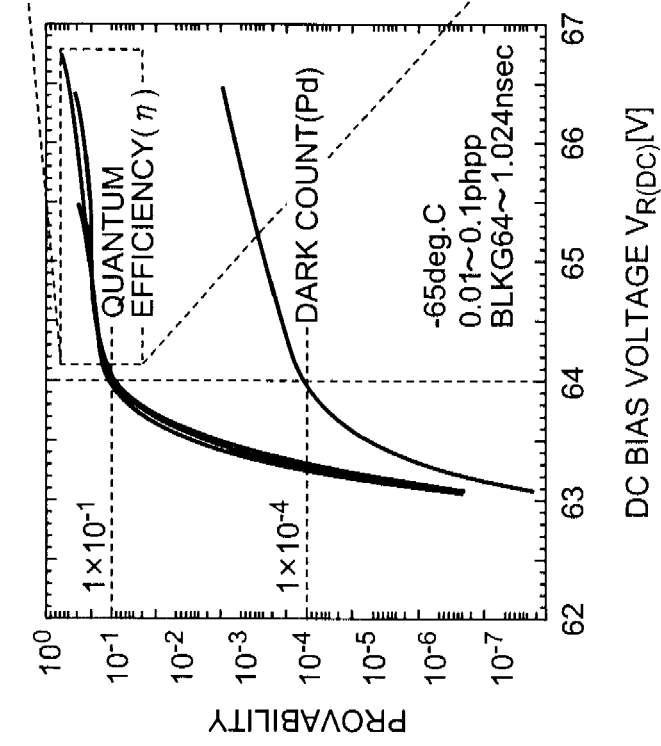
FIG. 8B is a part of the graph of FIG. 8A, enlarged.

FIG. 8A is a graph showing an example of the relationship between the DC bias applied to an APD and the detection efficiency, in the case of the APD being driven in the gated Geiger mode. FIG. 8B is an enlarged graph corresponding to a part of the graph of FIG. 8A. In general, what is used in photon reception is the area enlarged in FIG. 8B. In this area in use, it can be seen that as the DC bias is increased, the detection efficiency Q also gradually rises.

Therefore, if the proportion of "0"s in a generated sifted key (shared random numbers) is large, the value of DC bias to the photodetector 0 is reduced, thereby relatively lowering the detection efficiency $Q_0$, and/or the value of DC bias to the photodetector 1 is increased, thereby relatively raising the detection efficiency $Q_1$. Conversely, if the proportion of "1"s in a generated sifted key (shared random numbers) is large, the value of DC bias to the photodetector 0 is increased, thereby relatively raising the detection efficiency $Q_0$, and/or the value of DC bias to the photodetector 1 is reduced, thereby relatively lowering the detection efficiency $Q_1$. By adjusting the DC biases to the photodetectors 0 and 1 in this manner, the proportion of "0"s or "1"s in the sifted key can be made as close to a desired value as possible.

Figure 9:
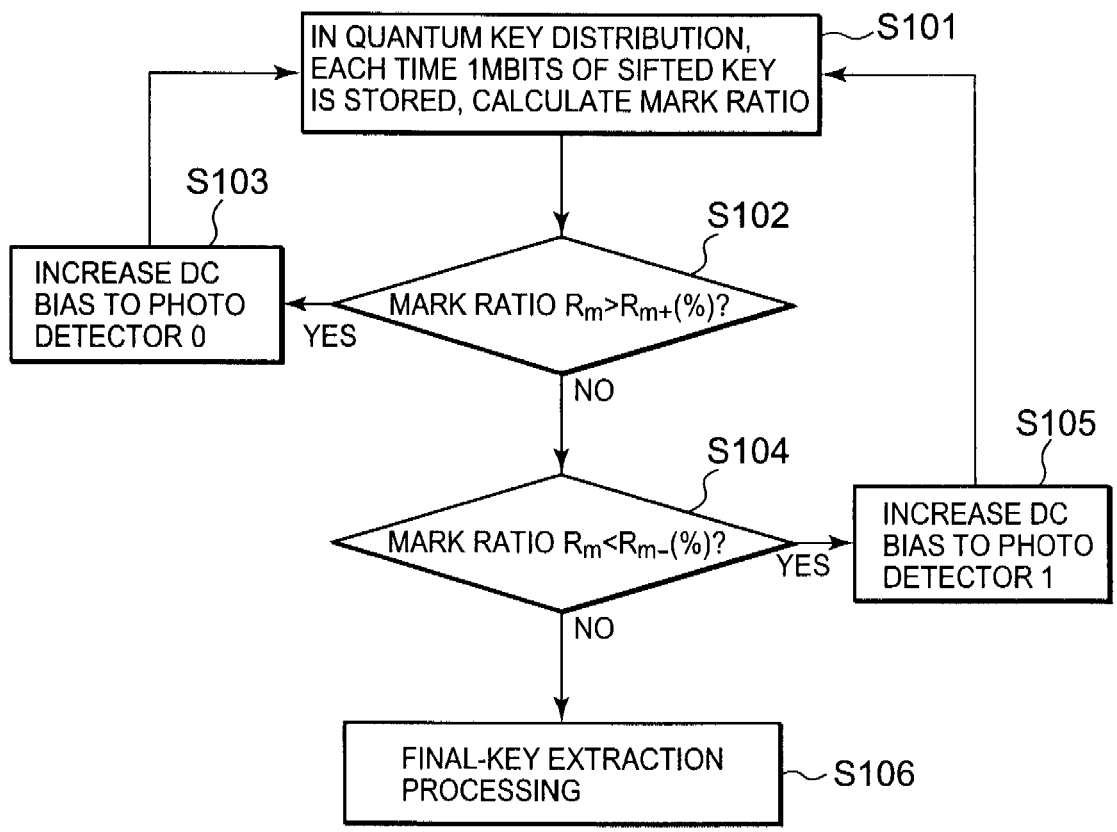
FIG. 9 is a flowchart showing DC bias control according to the first embodiment of the present invention.

FIG. 9 is a flowchart showing the DC bias control according to the first embodiment of the present invention. In the present embodiment, a configuration is made such that the mark ratio Rm of a random number sequence is monitored in units of 1 Mbits, and the photodetectors 0 and 1 are controlled based on the monitored mark ratio Rm. The DC bias adjuster 135 stores beforehand an upper-limit mark ratio Rm+ and a lower-limit mark ratio Rm− indicating a permissible range around a desired mark ratio $Rm_0$, as a reference for determining whether to adjust the photodetectors.

As mentioned earlier, if the random number test NIST SP800-22 is adopted, the mark ratio Rm needs to be in the range of 50%±0.13% in the case of 1-Mbit random numbers. Accordingly, the optimal mark ratio $Rm_0$, upper-limit mark ratio Rm+ and lower-limit mark ratio Rm− are set at 50%, 50.13% and 49.87%, respectively. Of course, these are examples. The unit for calculating the mark ratio does not need to be 1 Mbits but may be a certain quantity stored. The permissible range of the mark ratio for determining whether or not to perform a bias adjustment for the photodetectors does not need to be 50%±0.13% but may be values that are larger and/or smaller than these values.

Referring to FIG. 9, in a quantum key generation process, basis reconciliation is performed on a raw key shared between Alice and Bob, subsequently followed by the generation of a sifted key. The random number quality monitor 134 calculates the mark ratio Rm each time 1 Mbits of this sifted key is stored in the storage section 136 (S101).

When the mark ratio Rm calculated by the random number quality monitor 134 is greater the upper-limit mark ratio Rm+, that is, when the number of "1"s in the subsequence of random numbers is larger than an upper-limit value (S102: Yes), then the DC bias adjustor 135 raises the value of DC bias to the photodetector 0 so that the number of "0"s is relatively increased (S103). However, this is a relative increase, and therefore alternatively, such an adjustment also may be made that the value of DC bias to the photodetector 1 is lowered at the step S103.

When the calculated mark ratio Rm is equal to or smaller than the upper-limit mark ratio Rm+ (S102: No), it is next checked whether the mark ratio Rm is smaller than the lower-limit mark ratio Rm− (S104). When Rm<Rm−, that is, when the number of "0"s in the subsequence of random numbers is relatively larger (S104: Yes), the DC bias adjustor 135 raises the value of DC bias to the photodetector 1 so that the number of "1"s is increased (S105). In this case as well, alternatively, the value of DC bias to the photodetector 0 may be relatively lowered.

When the mark ratio Rm is not greater than the upper-limit mark ratio Rm+ and not smaller than the lower-limit mark ratio Rm− (S104: No), final-key extraction processing (error correction processing and privacy amplification processing described already) is executed based on this sifted key (S106).

Note that in the present embodiment, for the photodetectors 0 and 1, APDs are shown as an example and used in the gated Geiger mode, but the present invention is not limited to this embodiment. The present invention can be applied to any systems in which very weak light is detected by applying a high voltage to a photo-detection element. Moreover, although the subject monitored for the mark ratio Rm is a sifted key in the present embodiment, a cryptographic key after error correction may be monitored.

Incidentally, the random number quality monitor 134 and DC bias adjuster 135 that execute the DC bias control shown in FIG. 9 can also be implemented by executing a program on a program-controlled processor.

Second Embodiment

FIG. 10 is a block diagram showing a schematic configuration of a quantum key distribution system to which a random number quality control circuit according to a second embodiment of the present invention is applied. In the second embodiment, DC biases to be applied to photodetectors 0 and 1 in Bob are changed based on the mark ratio Rm of a sifted key obtained in Alice. On Alice's side, as will be described later, a random number source that generates physical random numbers is provided. Since a sifted key can be extracted based on these physical random numbers, DC bias control based on the mark ratio of the sifted key can be further enhanced in precision. Note that the blocks having the same functions as the counterparts in FIG. 7A are denoted by the same reference numerals as in FIG. 7A, and detailed description thereof will be omitted.

Referring to FIG. 10, in the quantum key distribution system according to the present embodiment, Alice 21 and Bob 23 are connected through optical fiber 22 and share a cryptographic key by superposing information on the phase of a photon to be transmitted. In addition to the optical coupler 131 and photodetectors 0 and 1 as described already, Bob 23 is also provided with a memory 214 and a DC bias adjuster 215. The memory 214 stores bit numbers respectively assigned to a sequence of bits arriving from Alice 21, as well as random number information obtained and selection bases used when respective bits are received. In quantum key distribution, as described earlier, since an optical signal with intensity lowered to a single-photon level is transmitted from Alice 21 to Bob 23, only part of the sequence of bits sent by Alice 21 arrives at Bob 23. Bob 23 stores in the memory 214 the arriving bit numbers, random number information obtained, and selection bases used when respective bits are received. Bob 23 notifies Alice 21 of the bit numbers and information about the selection bases.

Alice 21 is provided with a random number source 211 that generates physical random numbers, a memory 212, and a random number quality monitor 213. The physical random numbers are an ideal sequence of random numbers having no periodicity. As a physical random number generator, a physical random number generator is known. Physical random numbers are random numbers obtained based on various physical phenomena, and known methods include those utilizing thermal noises inside a semiconductor or quantum optics. In Alice 21, when a sequence of bits is sent out from the random number source 211, modulation information (random number information and a basis) applied to each bit is stored in the memory 212. Of this information, information of the bit numbers and the selection bases notified from Bob 23 is used to generate a sequence of random numbers consisting of only random number information corresponding to bit numbers that have been able to be shared between Alice 21 and Bob 23. This sequence of random numbers is a sifted key.

The random number quality monitor 213 in Alice 21 calculates the mark ratio Rm of this sifted key and notifies Bob 23 of the result of this calculation or the result of mark ratio assessment. The DC bias adjustor 215 in Bob 23 adjusts the DC biases to be applied to the photodetectors 0 and 1 based on the received mark ratio Rm, as described in the first embodiment. Alternatively, the DC biases to the photodetectors 0 and 1 may be similarly adjusted according to the result of mark ratio assessment.

In the present embodiment, the photodetectors in Bob 23 are adjusted based on the mark ratio Rm of a sifted key obtained in Alice 21. The adjustment method of the present embodiment is different in the following points from an adjustment performed based on the mark ratio Rm of a sifted key obtained in Bob 23.

The random number source 211 provided to Alice 21 generates physical random numbers. Therefore, the sifted key on Alice's side is a result of randomly extracting part of the sequence of physical random numbers (physical random numbers). On the other hand, the sifted key obtained in Bob 23 is a result of adding bit errors to the Alice's sifted key, wherein bit errors have occurred along the transmission line 22 and in the photodetectors 0 and 1.

Taking the above-mentioned random number test as a specific example of a tool for inspecting the quality of random numbers, physical random numbers pass all the test items included in this random number test. Therefore, Alice's sifted key randomly extracted from the sequence of physical random numbers, in theory, should pass all the test items in this random number test. If Alice's sifted key does not pass the random number test, it can be thought that there is an unbalance in detection efficiency (such an unbalance that "0" is detected more easily or "1" is detected more easily). Accordingly, in the present embodiment, based on the mark ratio Rm calculated in Alice 21, the photodetectors 0 and 1 in Bob 23 are adjusted so that the sifted key obtained by Alice 21 will pass the random number test. On the other hand, since Bob's sifted key has a tendency of errors (such as "0" more easily turning into "1" as an error, or "1" more easily turning into "0" as an error), Bob's sifted key does not always pass the random number test. Accordingly, higher-precision control can be achieved in the case of performing DC bias adjustment based on the mark ratio Rm calculated from Alice's sifted key as in the present embodiment, than in the case of using Bob's sifted key.

FIG. 11 is a flowchart showing the DC bias control according to the second embodiment. The random number quality monitor 213 calculates the mark ratio Rm each time 1 Mbits of a sifted key is stored in a storage section (S201). The random number quality monitor 213 determines whether or not the calculated mark ratio Rm is greater than the upper-limit mark ratio Rm+ (S202).

When the calculated mark ratio Rm is greater than the upper-limit mark ratio Rm+ (S202: Yes), Alice 21 sends a notification of such result to Bob 23. The DC bias adjustor 215 in Bob 23 raises the value of DC bias to the photodetector 0 so that the number of "1"s in the sequence of random numbers will be relatively reduced, that is, the number of "0"s will be relatively increased (S203). Alternatively, the value of DC bias to the photodetector 1 may be lowered so that the number of "1"s will be relatively reduced.

When the calculated mark ratio Rm is not greater than the upper-limit mark ratio Rm+ (S202: No), the random number quality monitor 213 next checks whether or not the mark ratio Rm is smaller than the lower-limit mark ratio Rm− (S204). When Rm<Rm− (S204: Yes), Alice 21 sends a notification of such result to Bob 23. The DC bias adjustor 215 in Bob 23 lowers the value of DC bias to the photodetector 0 so that the number of "0"s in the sequence of random numbers will be relatively reduced (S205). Alternatively, the value of DC bias to the photodetector 1 may be raised.

When the mark ratio Rm is not greater than the upper-limit mark ratio Rm+ and not smaller than the lower-limit mark ratio Rm− (S204: No), final-key extraction processing (error correction processing and privacy amplification processing described already) is executed based on this sifted key (S206, S207).

Note that in the present embodiment, for the photodetectors 0 and 1, APDs are shown as an example and used in the gated Geiger mode, but the present invention is not limited to this embodiment. The present invention can be applied to any systems in which very weak light is detected by applying a high voltage to a photo-detection element. Moreover, although the subject monitored for the mark ratio Rm is a sifted key in the present embodiment, a cryptographic key after error correction may be monitored. Further, the unit for calculating the mark ratio does not need to be 1 Mbits but may be a certain quantity stored. The values of the upper-limit mark ratio Rm+ and lower-limit mark ratio Rm− can be determined according to purposes, and do not need to be 50%±0.13% but may be larger and/or smaller than these values.

Incidentally, the random number quality monitor 213 and DC bias adjuster 215 that execute the DC bias control shown in FIG. 11 can also be implemented by executing a program on a program-controlled processor.

Third Embodiment

Figures 12A, 12B:
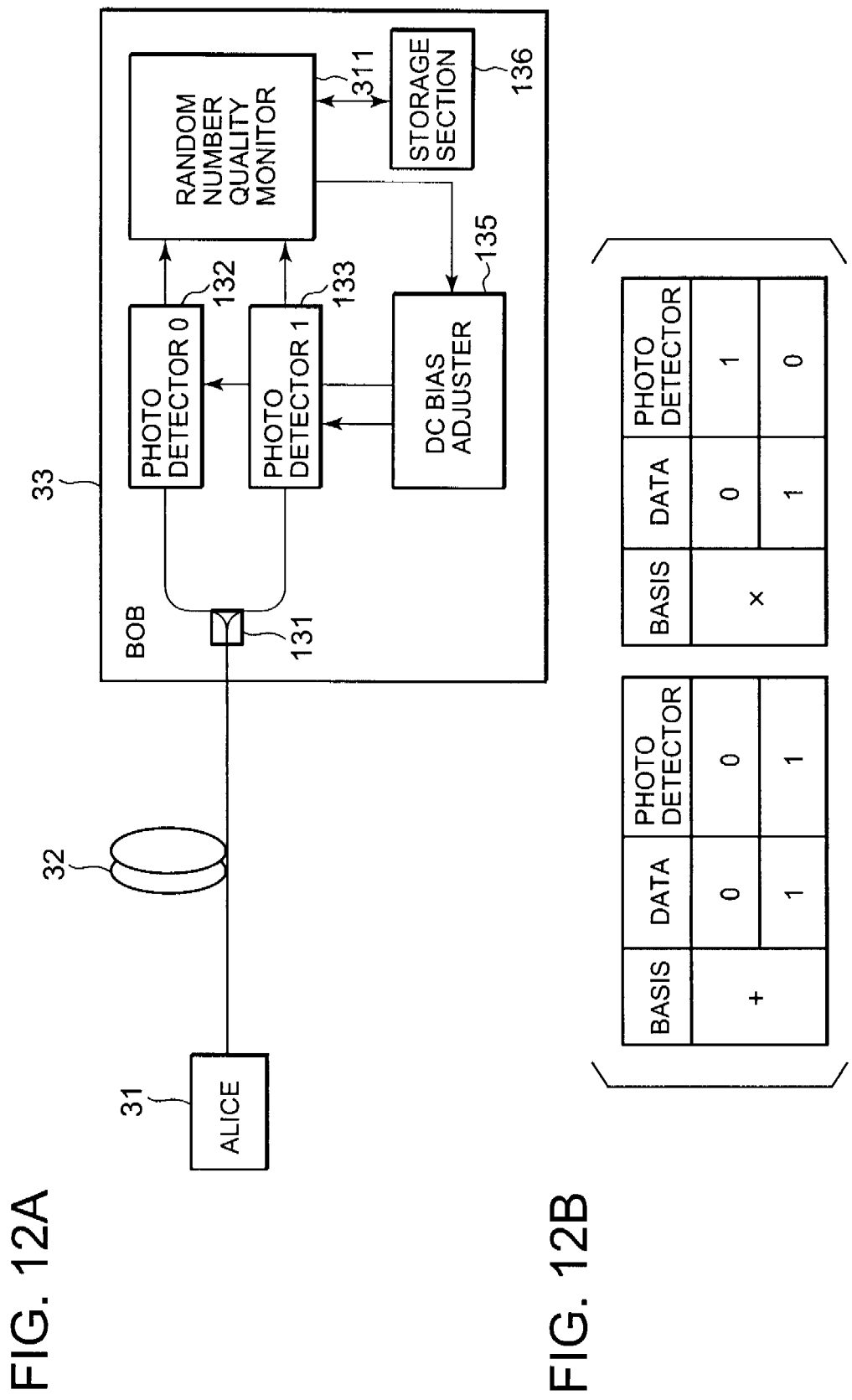
FIG. 12A is a block diagram showing a schematic configuration of a quantum key distribution system to which a random number quality control circuit according to a third embodiment of the present invention is applied.
FIG. 12B is a table showing the operations of an optical circuit in the third embodiment.

FIG. 12A is a block diagram showing a schematic configuration of a quantum key distribution system to which a random number quality control circuit according to a third embodiment of the present invention is applied. FIG. 12B is a table showing the operations of an optical circuit in the third embodiment. Note that the blocks having the same functions as the counterparts in FIG. 7A are denoted by the same reference numerals as in FIG. 7A, and detailed description thereof will be omitted.

In the present embodiment, adjustment is performed in combination with the mark ratio improving method based on Bethune described with reference to FIG. 5. As described with FIG. 5, the probabilities of obtaining "0" and "1" in a sifted key are as follows;

(probability of obtaining "0")=$P1+P3=S1*Q0+S3*Q1$ (probability of obtaining "1")=$P2+P4=S2*Q1+S4*Q4$ As described already, in the system of the present embodiment, coding is performed such that a signal is outputted to the photodetector 0 when "0" is sent by using the + basis; a signal is outputted to the photodetector 1 when "1" is sent by using the + basis; a signal is outputted to the photodetector 1 when "0" is sent by using the × basis; and a signal is outputted to the photodetector 0 when "1" is sent by using the × basis. The above P1 to P4 are the probabilities of the four quantum states being detected, respectively. S1 is the probability of "0" being generated with the + basis; S2 is the probability of "1" being generated with the + basis; S3 is the probability of "0" being generated with the × basis; S4 is the probability of "1" being generated with the × basis. Q0 and Q1 are the detection efficiencies of the photodetectors 0 and 1, respectively. The present embodiment, unlike the conventional cases, premises that the probabilities S1 to S4 actually are not equal to each other due to temporal fluctuations in device driving conditions and the like.

As an example, it is assumed that before adjustments are made for the photodetectors, the mark ratio Rm is smaller than the desired mark ratio $Rm_0$ (=50%), that is, the number of "0"s is larger than the number of "1"s. Therefore, $(S1*Q0+S3*Q1)>(S2*Q1+S4*Q0)$.

According to the present embodiment, the direction of an adjustment of the detection efficiency Q0 is determined depending on which one of S1 and S4 is greater than the other, and the direction of an adjustment of the detection efficiency Q1 is determined depending on which one of S2 and S3 is greater than the other.

When S1>S4, lowering the detection efficiency Q0 will make the mark ratio closer to 50%. This can be proved as follows. When the detection efficiency Q0 is changed to $Q0-\Delta q (\Delta q>0)$, the following results:

(Number of "0"s after detection efficiency adjustment)−(Number of "1"s after detection efficiency adjustment)=$[S1*(Q0-\Delta q)+S3*Q1]-[S2*Q1+S4*(Q0-\Delta q)]=[(S1*Q0+S3*Q1)-S1*\Delta q]-[(S2*Q1+S4*Q0)-S4*\Delta q]=[(S1*Q0+S3*Q1)-(S2*Q1+S4*Q0)]-(S1-S4)*\Delta q<[(S1*Q0+S3*Q1)-(S2*Q1+S4*Q0)]$=(Number of "0"s before detection efficiency adjustment)−(Number of "1"s before detection efficiency adjustment).

That is, the fact that the difference between the numbers of "0"s and "1"s is reduced by an adjustment of the detection efficiency means that the mark ratio is made closer to 50%. Conversely, when S1<S4, the mark ratio Rm can be made closer to 50% by increasing the detection efficiency Q0.

Similarly, when S2>S3, the mark ratio Rm can be made closer to 50% by increasing the detection efficiency Q1. When S2<S3, the mark ratio Rm can be made closer to 50% by lowering the detection efficiency Q1.

In the case where the mark ratio before adjustments for the photodetectors is larger than 50%, it suffices to reverse all the directions of the detection efficiency adjustments as described above.

Figure 13:
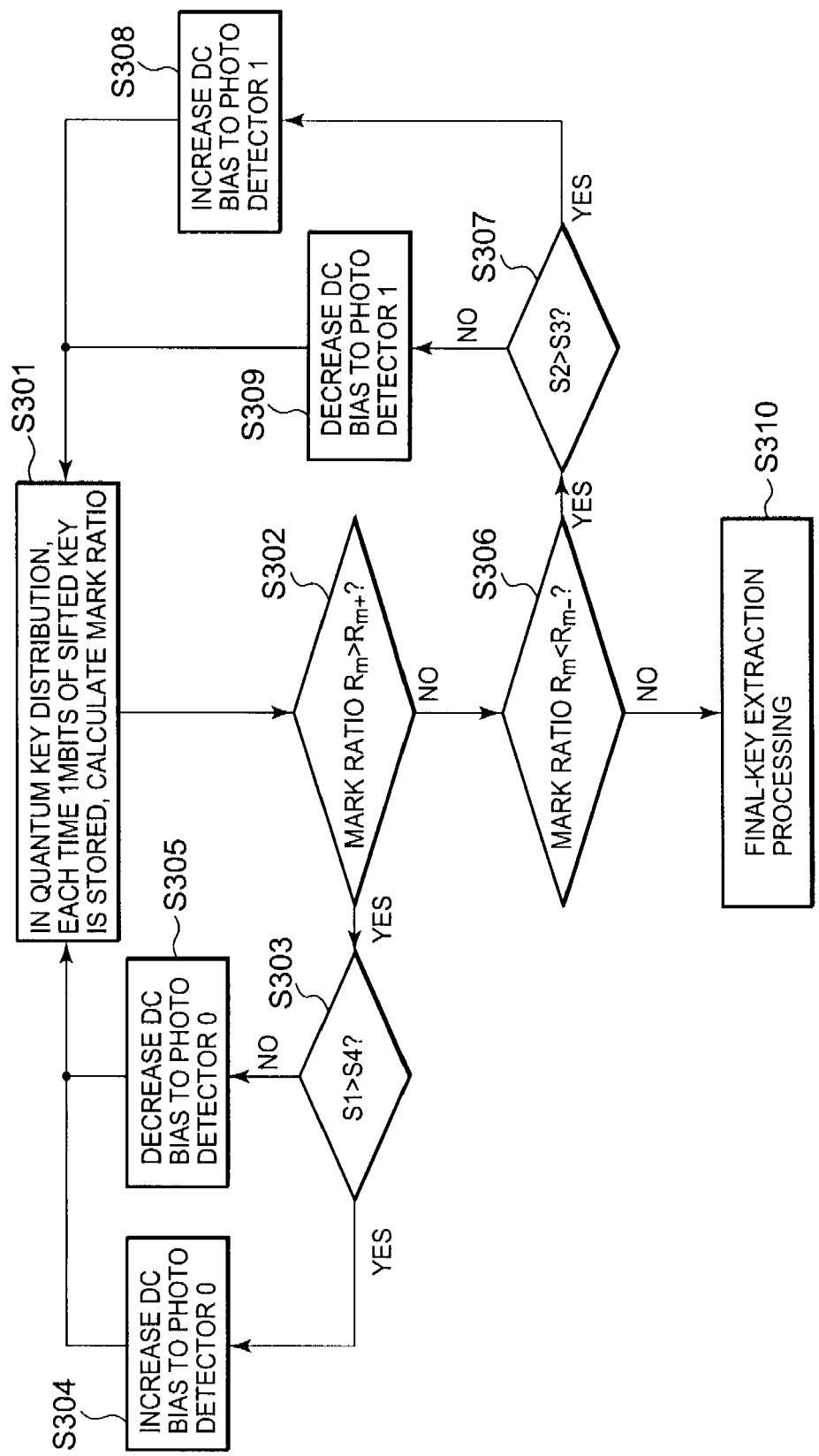
FIG. 13 is a flowchart showing DC bias control according to the third embodiment.

FIG. 13 is a flowchart showing the DC bias control according to the third embodiment. First, S1, S2, S3 and S4 are measured beforehand to compare magnitudes among them. In addition, as mentioned above, the values of the upper-limit mark ratio Rm+ and lower-limit mark ratio Rm− are also determined beforehand.

A random number quality monitor 311 calculates the mark ratio Rm each time 1 Mbits of a sifted key is stored in a storage section (S301) and determines whether or not the calculated mark ratio Rm is greater than the upper-limit mark ratio Rm+ (S302).

When the calculated mark ratio Rm is greater than the upper-limit mark ratio Rm+ (S302: Yes), S1 and S4 are compared in magnitude (S303). When S1>S4 (S303: Yes), the DC bias to the photodetector 0 is increased (S304). When S1≤S4 (S303: No), the DC bias to the photodetector 0 is reduced (S305).

When the calculated mark ratio Rm is not greater than the upper-limit mark ratio Rm+ (S302: No) and is smaller than the lower-limit mark ratio Rm− (S306: Yes), S2 and S3 are compared in magnitude (S307). When S2>S3 (S307: Yes), the DC bias to the photodetector 1 is increased (S308). When S2≤S3 (S307: No), the DC bias to the photodetector 1 is reduced (S309).

When the calculated mark ratio Rm is not greater than the upper-limit mark ratio Rm+ and not smaller than the lower-limit mark ratio Rm− (S306: No), final-key extraction processing (error correction processing and privacy amplification processing described already) is executed based on the sifted key in question (S310).

Incidentally, it suffices that the proportion of "0"s or "1"s is increased or reduced relatively. Therefore, replacements can be made in the control steps S303 to S305 for the photodetector 0 and the control steps S307 to S309 for the photodetector 1 as follows:

1) In place of the step S303, the step S307, where S2 and S3 are compared, is placed. The control to reduce the DC bias to the photodetector 1 is performed in place of the step S304, and the control to increase the DC bias to the photodetector 1 is performed in place of the step S305.

2) In place of the step S307, the step S303, where S1 and S4 are compared, is placed. The control to reduce the DC bias to the photodetector 1 is performed in place of the step S304, the control to reduce the DC bias to the photodetector 0 is performed in place of the step S308, and the control to increase the DC bias to the photodetector 0 is performed in place of the step S309.

Note that in the present embodiment, for the photodetectors 0 and 1, APDs are shown as an example and used in the gated Geiger mode, but the present invention is not limited to this embodiment. The present invention can be applied to any systems in which very weak light is detected by applying a high voltage to a light receiving element. Moreover, although the subject monitored for the mark ratio Rm is a sifted key in the present embodiment, a cryptographic key after error correction may be monitored. Further, the unit for calculating the mark ratio does not need to be 1 Mbits but may be a certain quantity stored. The values of the upper-limit mark ratio Rm+ and lower-limit mark ratio Rm− can be determined according to purposes, and do not need to be 50%±0.13% but may be larger and/or smaller than these values.

Incidentally, the random number quality monitor 311 and DC bias adjuster 135 that execute the DC bias control shown in FIG. 13 can also be implemented by executing a program on a program-controlled processor.

Fourth Embodiment

FIG. 14A is a block diagram showing a schematic configuration of a quantum key distribution system to which a random number quality control circuit according to a fourth embodiment of the present invention is applied. FIG. 14B is a table showing the operations of an optical circuit in the fourth embodiment. In the present embodiment, as in the first embodiment, the mark ratio Rm of a sifted key is monitored in Bob 43, and photodetectors 0 and 1 are adjusted based on a result of the monitoring. However, unlike the first embodiment, DC bias is not adjusted in the fourth embodiment, but the pulse heights of gate pulses to be applied to the photodetectors 0 and 1 are adjusted by using a pulse height adjustor 411. The other configurations and functions are similar to those of the first embodiment shown in FIG. 7A. Therefore, the blocks having the same functions as the counterparts in FIG. 7A are denoted by the same reference numerals as in FIG. 7A, and detailed description thereof will be omitted.

FIG. 15A is a diagram of voltage waveforms in the gated Geiger mode in which pulse bias is applied to a photon receiver at a timing of the arrival of a photon. FIG. 15B is a diagram of voltage waveforms when the DC bias value of the pulse bias is increased, corresponding to the first embodiment. FIG. 15C is a diagram of voltage waveforms when the pulse height of the pulse bias is increased.

In general, in the case of using an avalanche photodiode (APD) as a photon detector by applying gate voltages to the APD, there are two methods for improving the detection efficiency by adjusting a pulse bias signal as follows: first method of increasing DC bias shown in FIG. 15B, which has been already described in the first embodiment; and second method of adjusting the height of a pulse shown in FIG. 15C, which is used in the present embodiment.

Figure 16:
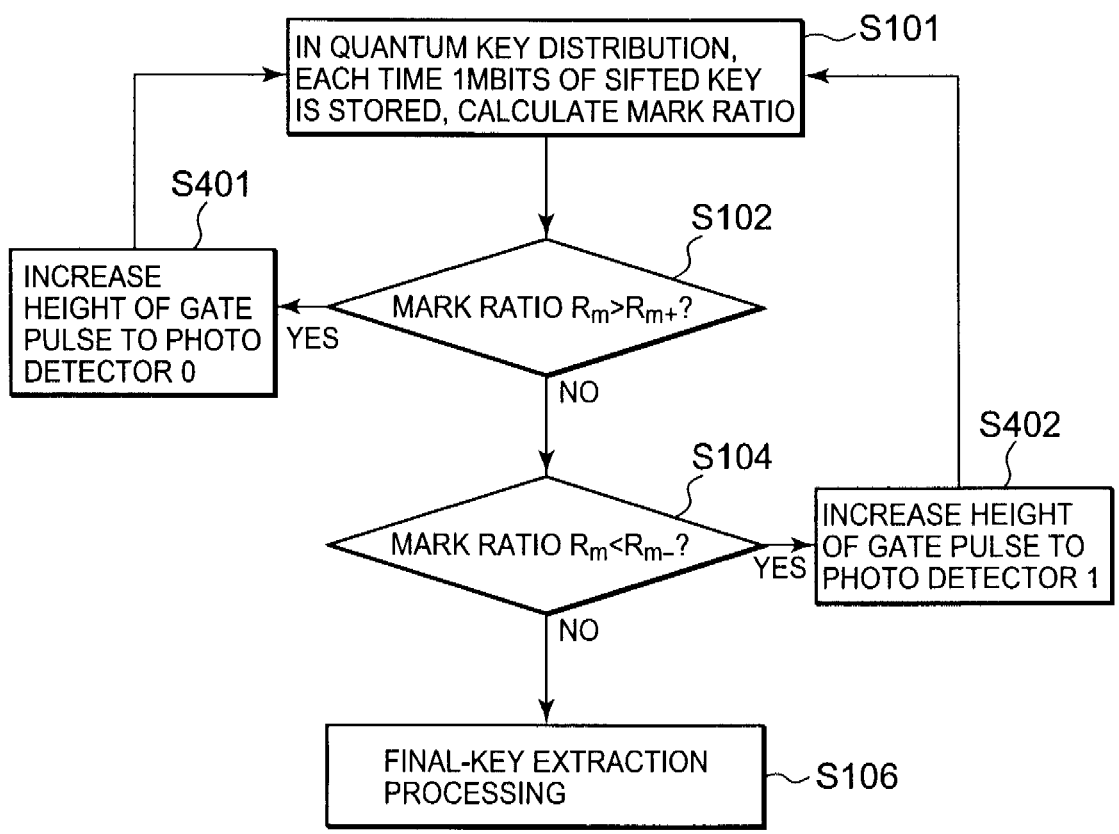
FIG. 16 is a flowchart showing pulse bias control according to the fourth embodiment.

FIG. 16 is a flowchart showing the pulse bias control according to the fourth embodiment. However, the steps same as those of the first embodiment in FIG. 9 are denoted by the same reference symbols and numerals as in FIG. 9, and description thereof will be omitted.

Referring to FIG. 16, when the mark ratio Rm calculated by the random number quality monitor 134 is greater than the upper-limit mark ratio Rm+, that is, when the number of "1"s in a subsequence of random numbers is larger than an upper-limit value (S102: Yes), then the pulse height adjustor 411 increases the voltage of a gate pulse to be applied to the photodetector 0 so that the number of "0"s will be relatively increased (S401). However, this is a relative increase, and therefore such an adjustment may also be made at the step S401 that the voltage of a gate pulse to the photodetector 1 is lowered.

When the calculated mark ratio Rm is not greater than the upper-limit mark ratio Rm+ (S102: No) and is smaller than the lower-limit mark ratio Rm− (S104: Yes), then since the number of "0"s in the sequence of random numbers is relatively larger, the voltage of a gate pulse to the photodetector 1 is raised so that the number of "1"s will be increased (S402).

Note that in the step S402, the voltage of a gate pulse to the photodetector 0 may be lowered.

Note that although the subject monitored for the mark ratio Rm is a sifted key in the present embodiment, a cryptographic key after error correction may be monitored. Further, the unit for calculating the mark ratio does not need to be 1 Mbits but may be a certain quantity stored. The values of the upper-limit mark ratio Rm+ and lower-limit mark ratio Rm− can be determined according to purposes, and do not need to be 50%±0.13% but may be larger and/or smaller than these values. Furthermore, the present embodiment can be applied to the control procedure described in the third embodiment shown in FIG. 13 (the steps S303 to S305 and S307 to S309).

Incidentally, the random number quality monitor 134 and pulse height adjuster 411 that execute the pulse bias control shown in FIG. 16 can also be implemented by executing a program on a program-controlled processor.

Fifth Embodiment

In a fifth embodiment of the present invention, neither DC bias nor pulse height is adjusted, but the phenomenon that the detection efficiency varies with the pulse timing of a gate pulse applied to a photon detector, is utilized. In the fifth embodiment, as an example, a random number quality control circuit is configured by using a balanced, gated-mode photon detector described in A. Tomita and K. Nakamura, "Balanced, gated-mode photon detector for quantum-bit discrimination at 1550 nm", Optics Letters, Vol. 27 (2002), pp. 1827-1829.

Figure 17:
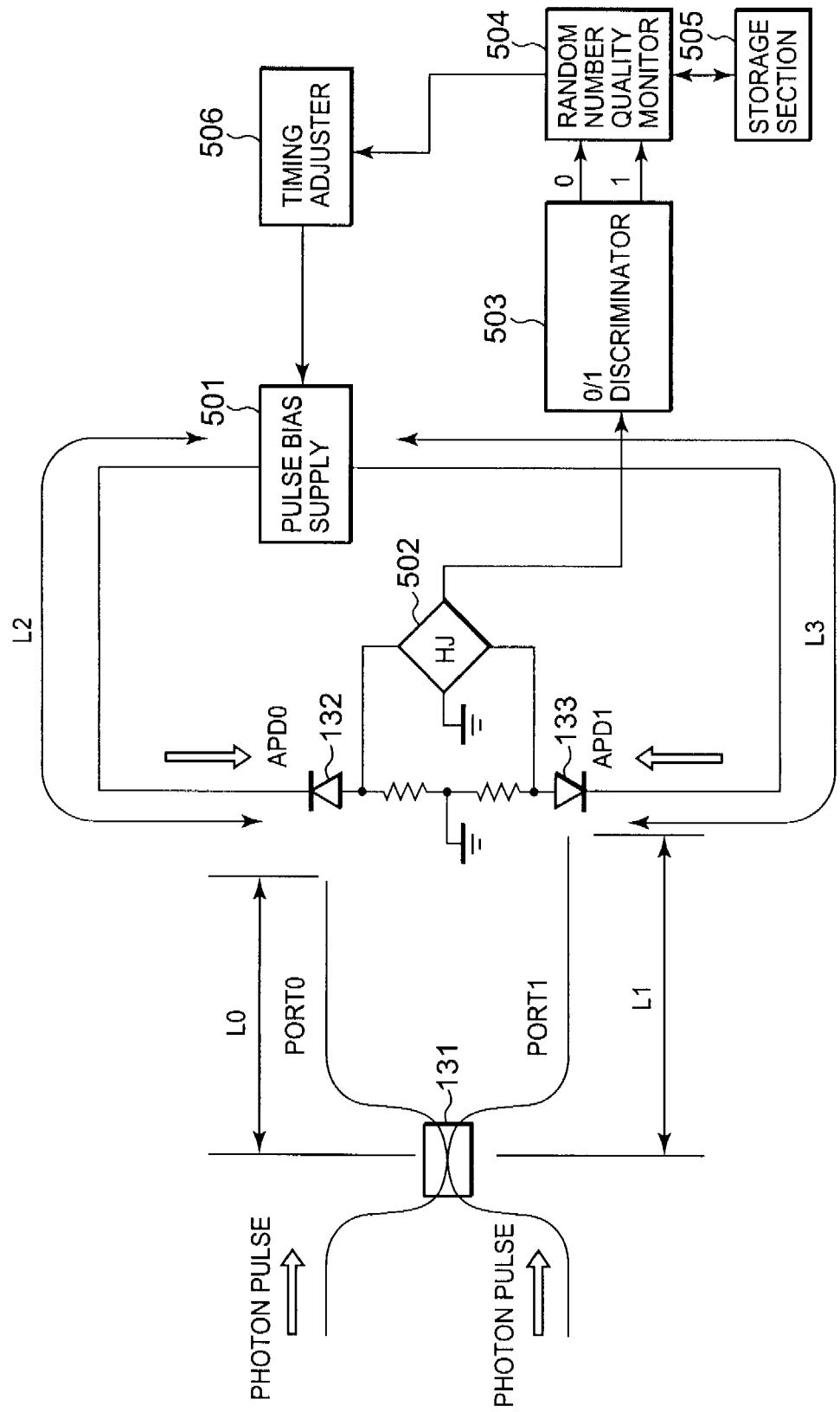
FIG. 17 is a block diagram showing a schematic configuration of a quantum key distribution system to which a random number quality control circuit according to a fifth embodiment of the present invention is applied.

FIG. 17 is a block diagram showing a schematic configuration of a quantum key distribution system to which the random number quality control circuit according to the fifth embodiment of the present invention is applied. A photodetector 132 (hereinafter, referred to as APD 0) and a photodetector 133 (hereinafter, referred to as APD 1) in the present embodiment are driven in the gated Geiger mode by a pulse bias supply 501. When optical pulses enter, they interfere at an optical coupler 131, and the result of this interference is outputted to a port 0 or port 1, depending on, for example, a difference between phase modulations performed in Alice and Bob. Each of the photon pulses after interference is subjected to optical-to-electrical conversion at the APD 0 or APD 1, and the difference between the output signals of the APDs is obtained at a hybrid junction 502. This differential operation cancels spikes occurring due to gated-mode driving the APD 0 and APD 1, resulting in the improved signal-to-noise ratio (SNR) of the photon detectors.

Since the positive/negative of an output of the hybrid junction 502 varies depending on whether an optical pulse after interference is detected by the APD 0 or APD 1, a discriminator 503 can discriminate between "0" and "1". The discriminator 503 outputs the result of the discrimination between "0" and "1" to a random number quality monitor 504. As described already, when a sequence of random numbers with a predetermined length has been stored in a storage section 505, the random number quality monitor 504 calculates the mark ratio Rm of this sequence, based on which a timing adjustor 506 adjusts the phase of pulse voltage outputted from the pulse bias supply 501.

FIGS. 18(a) to 18(c) are voltage waveform diagrams for describing the relationship between the pulse bias application timing and the detection efficiency. In general, as shown in FIG. 18(a), avalanche multiplication is most apt to occur inside an APD when a photon enters immediately after a gate pulse is applied to the APD, with the detection efficiency rising. When a photon incident timing is late for the rising edge of an applied pulse, avalanche multiplication is reduced, with the detection efficiency falling as shown in FIGS. 18(b) and 18(c).

There are many causes for a photon incident timing deviating from a timing of a pulse applied to a photon detector. For example, referring to FIG. 17, if the distance L0 of the port 0 from the optical coupler 131 to the APD 0 differs from the distance L1 of the port 1 from the optical coupler 131 to the APD 1, photon pulses after interference arrive in the respective APDs at different timings. Specifically, unless the lengths of the ports of the optical coupler 131 are perfectly the same, the distances L0 and L1 are different. Moreover, also in the case where a line length L2 from one of output terminals of the pulse bias supply 501 to the APD 0 differs from a line length L3 from the other output terminal of the pulse bias supply 501 to the APD1, gate pulses arrive in the respective APDs at different timings.

As described above, the times when photon pulses passing through the ports 0 and 1 respectively arrive in the APDs 0 and 1 are different, and the times when gate pulses generated by the same pulse bias supply 501 respectively arrive in the APDs 0 and 1 are also different. Therefore, if the phases of the gate pulses generated by the pulse bias supply 501 are gradually changed, a distribution of the number of photons counted by the APD 0 should not match a distribution of the number of photons counted by the APD 1.

Figure 19A:
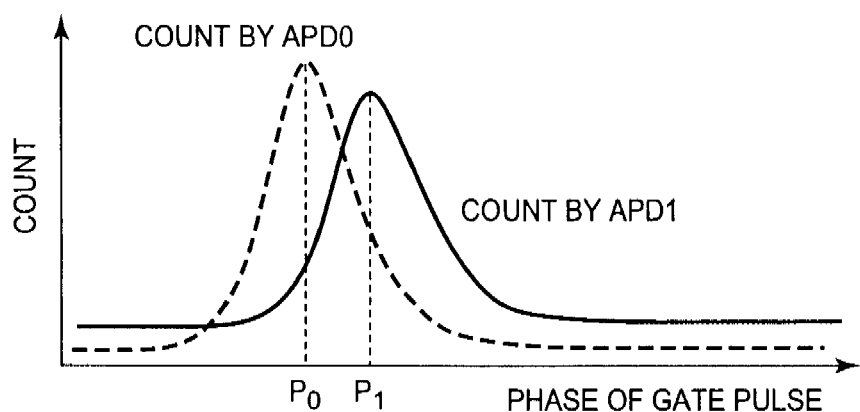
FIG. 19A is a graph showing an example of the distributions of counts made by APDs 0 and 1 respectively, with respect to the gate pulse phase.
Figure 19B:
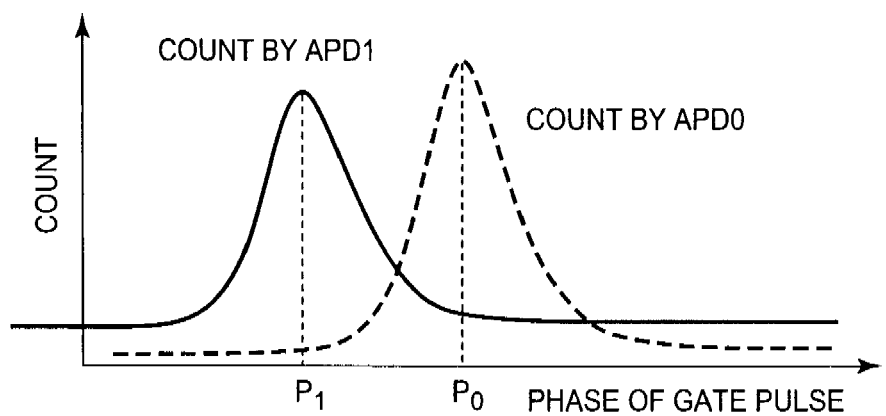
FIG. 19B is a graph showing another example of the distributions.

FIG. 19A is a graph showing an example of the distributions of counts made by the APDs 0 and 1, each with respect to the gate pulse phase. FIG. 19B is a graph showing another example of the distributions. The difference between the distributions in each of FIGS. 19A and 19B is caused by the difference between the detection efficiencies of the APDs 0 and APD1, the difference between the losses occurring along the respective paths, or the like. In any case, by changing the phase of a gate pulse, the count by the APD 0 and the count by the APD 1 each vary as shown in FIGS. 19A and 19B. Accordingly, the photon counts (equivalent to detection efficiencies) by the APDs 0 and APD1 can be adjusted by changing the phase of a gate pulse by using the timing adjuster 506, without adjusting the value of DC bias or the pulse height of a gate pulse as in the above-described first to fourth embodiments. This can be utilized for mark ratio adjustment.

Figure 20:
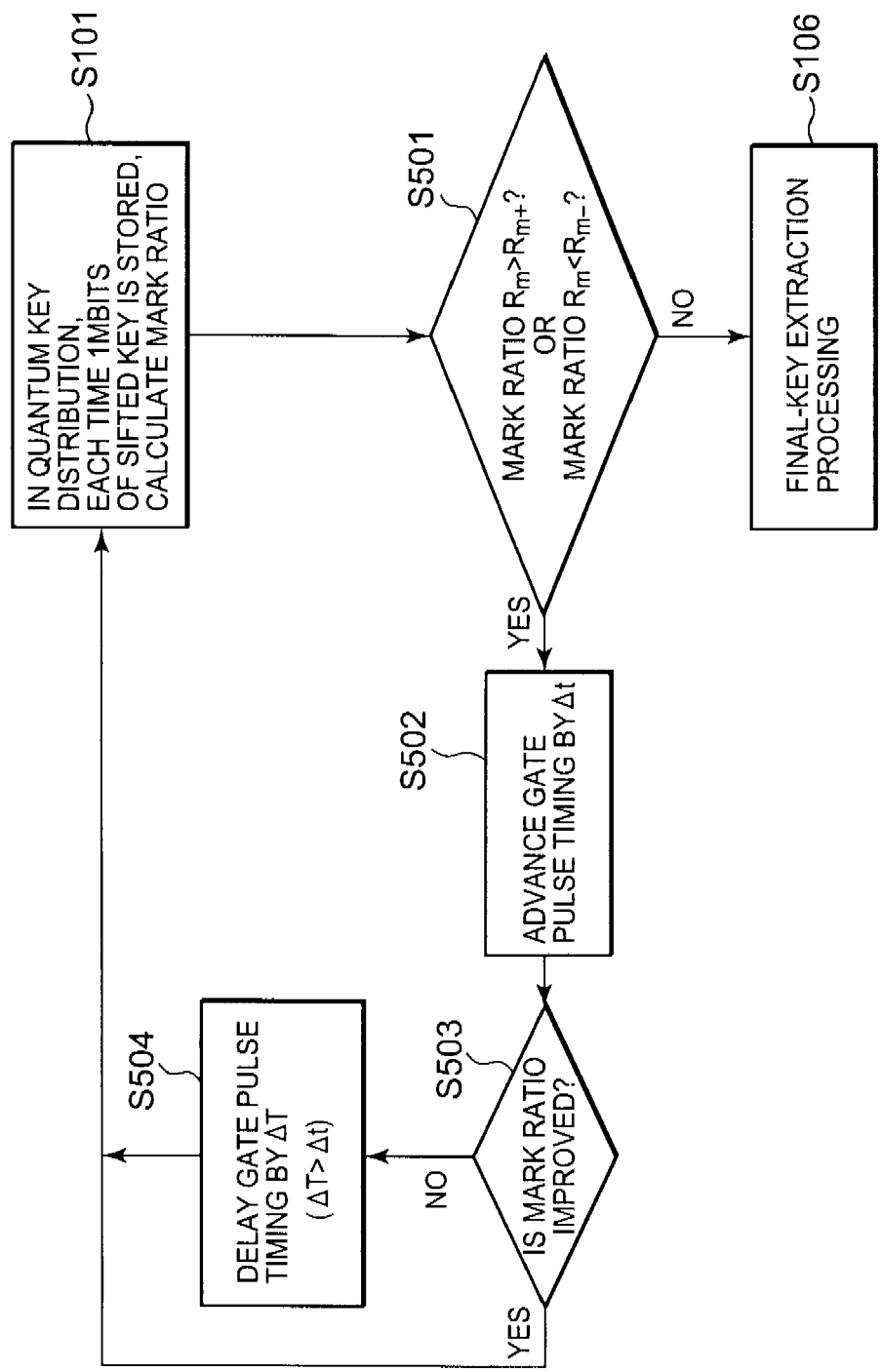
FIG. 20 is a flowchart showing pulse timing control according to the fifth embodiment.

FIG. 20 is a flowchart showing the pulse timing control according to the fifth embodiment. Note that the same steps as in the first embodiment shown in FIG. 9 are denoted by the same reference symbols and numerals, and description thereof will be omitted. As described above, the mark ratio of a sifted key can be adjusted by controlling the phase of a gate pulse so that it will be advanced or delayed. However, it cannot be known which of the advancing or delaying of the phase increases (or decreases) the mark ratio.

Therefore, as described already, each time 1 Mbits of a sifted key is stored, it is determined whether or not the calculated mark ratio Rm is out of a desired range defined with the upper-limit mark ratio Rm+ and lower-limit mark ratio Rm− (S501). When the mark ratio Rm is in the desired range (S501: No), final-key extraction processing (error correction processing and privacy amplification processing described already) is executed based on this sifted key as it is (S106).

When the mark ratio Rm is out of the desired range (S501: Yes), the timing adjuster 506 advances the phase of a gate pulse by Δt (S502). After the phase adjustment, the mark ratio of 1 Mbits of a sifted key is calculated again, and it is determined whether or not an improvement is made, as compared with the result before the phase adjustment (S503). If the mark ratio Rm after the adjustment is improved (closer to a desired mark ratio $Rm_0$) (S503: Yes), the process returns to the step S101, and the quantum key generation is continued.

If the mark ratio Rm of the sifted key after the phase adjustment is degraded as compared with the result before the phase adjustment (further from the desired mark ratio $Rm_0$), the timing of a gate pulse is delayed by $\Delta T$ that is larger than $\Delta t$ (S504), and the process returns to the step S101 and the quantum key generation is continued. Note that the following control may also be carried out: in the step S502, the timing of a gate pulse is delayed by $\Delta t$ instead of being advanced, and in the step S504, the timing of a gate pulse is advanced by $\Delta T$ instead of being delayed.

In this manner, when the mark ratio is out of the desired range, the timing of applying a gate pulse is moved, whereby, as described above, the detection efficiency can be changed, and the mark ratio of a sifted key can be improved.

Note that although the subject monitored for the mark ratio Rm is a sifted key in the present embodiment, a cryptographic key after error correction may be monitored. Further, the unit for calculating the mark ratio Rm does not need to be 1 Mbits but may be a certain quantity stored. The values of the upper-limit mark ratio Rm+ and lower-limit mark ratio Rm− can be determined according to purposes, and do not need to be 50%±0.13% but may be larger and/or smaller than these values.

Incidentally, the random number quality monitor 504 and timing adjuster 506 that execute the gate timing control shown in FIG. 20 can also be implemented by executing a program on a program-controlled processor.

Sixth Embodiment

In a sixth embodiment of the present invention, the quality of random numbers is controlled by adjusting the states of transmission signal light. In each of the above-described first to fifth embodiments, such a configuration is made that the mark ratio of a sifted key shared in course of quantum key distribution is compensated so as to be a desired value $Rm_0$ (for example, 50%) by adjusting a condition for driving a photon detector. However, if there is an unbalance in the states of transmission signal light as mentioned in the third embodiment, the amount of information leaked to an eavesdropper cannot be reduced. By intercepting the comparison communications through which Alice and Bob estimate the error rate of a shared key, Eve can assess the tendencies of "0" and "1" in a cryptographic key for each basis: for example, the tendencies that "more 0s are present in the case of the + bases" and "more 1s are present in the case of the × bases." As a result, the amount of information Eve can obtain increases in this case, in comparison with the case where there is no unbalance in the states of transmission signal light.

Figures 21A, 21B:
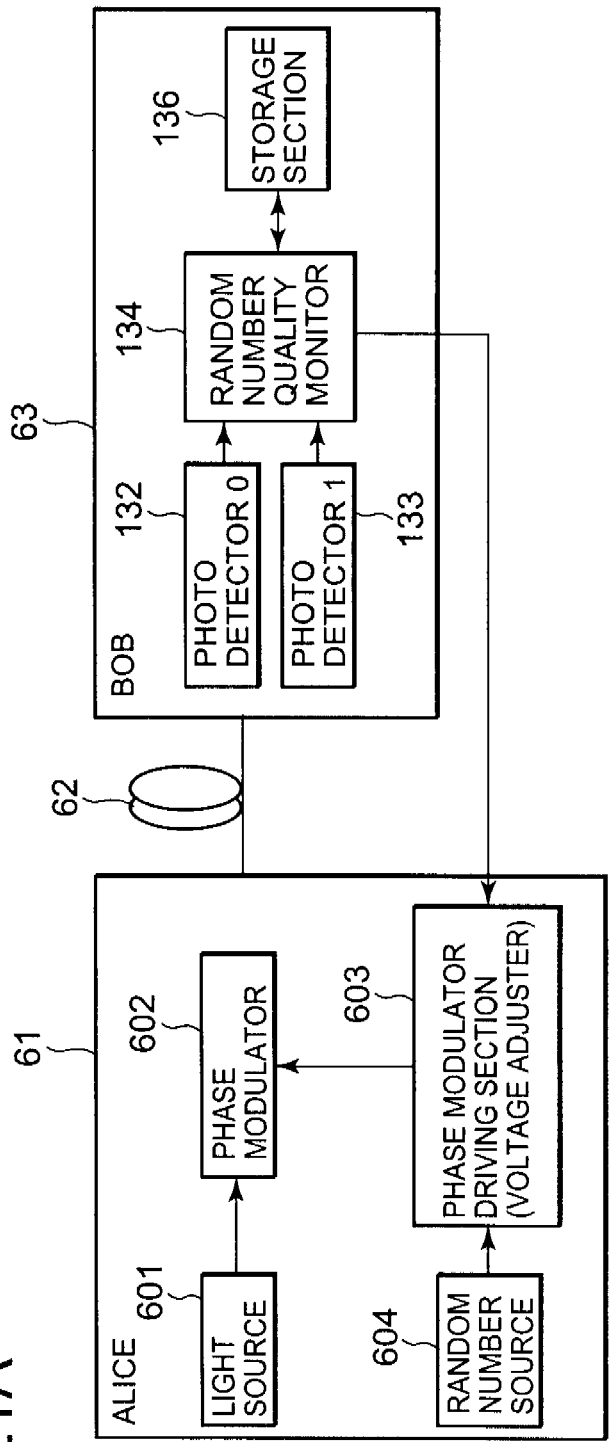
FIG. 21A is a block diagram showing a quantum key distribution system to which a random number quality control circuit according to a sixth embodiment of the present invention is applied.
FIG. 21B is a table showing the operations of an optical circuit in the sixth embodiment.

FIG. 21A is a block diagram showing a quantum key distribution system to which a random number quality control circuit according to the sixth embodiment of the present invention is applied. In the sixth embodiment, as in each embodiment described above, a cryptographic key is shared by superposing information on the phase of a photon to be transmitted. Alice 61 includes a light source 601 and a phase modulator 602 and can superpose information on the phase of a photon by allowing the phase modulator 602 to phase-modulate light from the light source 601. Specifically, the phase modulator 602 changes the relative phase of output light depending on a drive voltage from a phase modulator driving section 603. According to the BB84 protocol using the phase of a photon, since the phase of a photon is set to any one of 0, $\pi/2$, $\pi$, and $3\pi/2$ for transmission, the voltage for driving the phase modulator 602 also takes any one of corresponding four values (assumed to be $V_0$, $V_1$, $V_2$, and $V_3$, respectively). The phase modulator driving section 603 generates one of the four driving voltages by using a random number supplied from a random number source 604 and supplies it to the phase modulator 602.

The optical pulse signal thus phase-modulated is sent out to Bob 63 as very weak light at a single-photon level. Bob 63 includes photodetectors 0 and 1 similar to those of the first embodiment, and a random number quality monitor 134 having a storage section 136 for storing a sequence of random numbers with a predetermined length. If the four drive voltages applied to the phase modulator 602 in Alice 61 deviate from respective target values, a count made when each of the corresponding signals is received in Bob 63 is reduced, resulting in an unbalance in the shared key. Therefore, according to the present embodiment, the mark ratio of shared random number data for each kind of basis is fed back to Alice 61, and the four-value drive voltages are adjusted at the phase modulator driving section 603.

Figure 22:
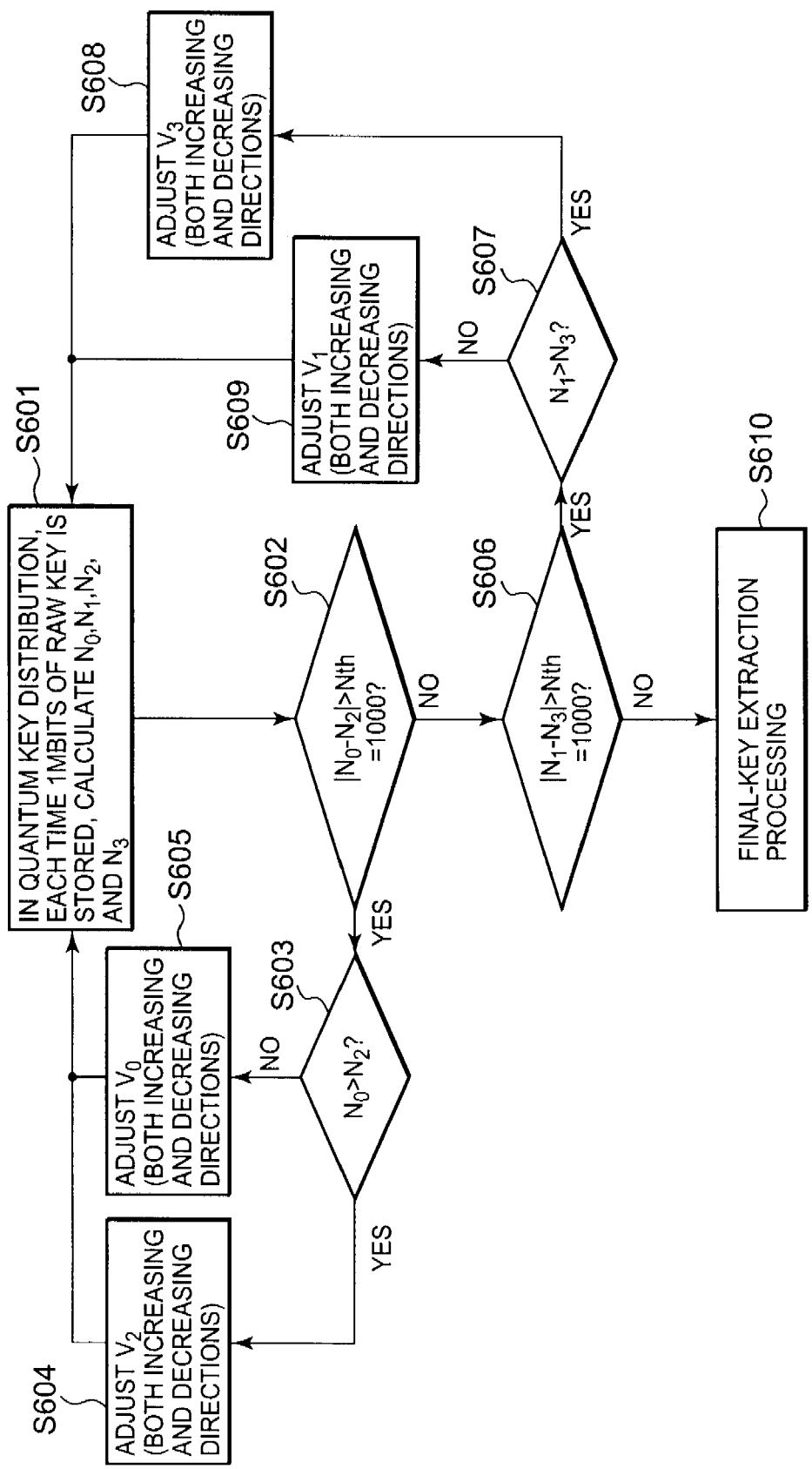
FIG. 22 is a flowchart showing drive voltage control according to the sixth embodiment.

FIG. 22 is a flowchart showing the drive voltage control according to the sixth embodiment. It is assumed that in a shared raw key, $N_0$ is the number of "0"s generated with the + basis, $N_1$ is the number of "1"s generated with the + basis, $N_2$ is the number of "0"s generated with the × basis, and $N_3$ is the number of "1"s generated with the × basis. Moreover, it is assumed that the relationship between the states of transmission signal light and the photodetectors 0 and 1 is similar to that of the first embodiment. Specifically, $N_0$ and $N_2$ make an output count of one of the photodetectors (here, photodetector 0), and $N_1$ and $N_3$ make an output count of the other (here, photodetector 1). When there is a significant difference between $N_0$ and $N_2$, it indicates that there is an unbalance in the states of transmission signal light (the same applies to $N_1$ and $N_3$).

Referring to FIG. 22, the random number quality monitor 134 in Bob 63 detects an optical signal from Alice 61 by using the photodetector 0 or 1 and thus stores 1 Mbits of a raw key, from which the random number quality monitor 134 calculates $N_0$, $N_1$, $N_2$, and $N_3$, which correspond to the combinations of a basis and random number information (S601).

Subsequently, the difference between $N_0$ and $N_2$ is calculated, and it is determined whether or not this difference exceeds a specific value $N_{th}$ (S602). Here, since it is ideal that the mean value of each of $N_0$, $N_1$, $N_2$, and $N_3$ is 1 Mbits/4, the standard deviation of each value is approximately $500(-(1,000,000/4)^{1/2})$. In the present embodiment, for simplicity, it is set that $N_{th}=1000$.

When $|N_0-N_2|>N_{th}$ (S602: Yes), Bob 63 notifies Alice 61 which of $N_0$ and $N_2$ is smaller. If $N_0>N_2$ (S603: Yes), the phase modulator driving section 603 in Alice 61 adjusts the drive voltage $V_2$ corresponding to $N_2$ (S604), and the process returns to the step S601. However, in the drive voltage adjustment, the increasing/decreasing direction cannot be exactly determined. Therefore, both directions (increasing and decreasing) are tried through a method as shown at the steps S502 to S504 in FIG. 20, and the direction in which the mark ratio is improved is adopted. If $N_0 \leq N_2$ (S603: No), the drive voltage $V_0$ corresponding to $N_0$ is similarly adjusted (S605).

When $|N_0-N_2| \leq N_{th}$ (S602: No), the difference between $N_1$ and $N_3$ is calculated, and it is determined whether or not this difference exceeds the specific value $N_{th}$ (S606). When $|N_1-N_3|>N_{th}$ (S606: Yes), Bob 63 notifies Alice 61 which of $N_1$ and $N_3$ is smaller. If $N_1>N_3$ (S607: Yes), the phase modulator driving section 603 in Alice 61 adjusts the drive voltage $V_3$ corresponding to $N_3$ (S608), and the process returns to the step S601. Here as well, since the increasing/decreasing direction for the drive voltage adjustment cannot be exactly determined, both directions (increasing and decreasing) are tried through a method as shown at the steps S502 to S504 in FIG. 20, and the direction in which the mark ratio is improved is adopted. If $N_1 \leq N_3$ (S607: No), the drive voltage $V_1$ corresponding to $N_1$ is similarly adjusted (S609).

According to the present embodiment, Bob (receiver) counts the number of detections of each signal state and determines the presence of an unbalance, but Alice (sender) may be in charge of similar determination steps. Although the relationships between the states of transmission signal light and the photodetectors are assumed to be as in the first embodiment, the present embodiment may also apply to relationships as described in the third embodiment. Moreover, as for the index of an unbalance in the states of transmission signal light, although the difference between the numbers of two states detected by the same photon detector is used, the presence of an unbalance may be determined based on a deviation of the count of each of the four states from a probabilistic theoretical value, independently of the detectors. Further, there is no problem if the specific values used in the present embodiment, such as "1 Mbits" and "$N_{th}$=1000", are other values, and such cases shall also be included in the present invention.

Furthermore, the present embodiment may be combined with any of the controls (first to fifth embodiments) in which the photodetectors 0 and 1 are controlled on Bob's side. Thereby, the photodetectors may be adjusted on the receiving side, Bob, and further the photon modulator may be adjusted on the sending side, Alice.

Incidentally, the random number quality monitor 134 and phase modulator driving section 603 that execute the drive voltage control shown in FIG. 22 can also be implemented by executing a program on a program-controlled processor.

Seventh Embodiment

Figure 23:
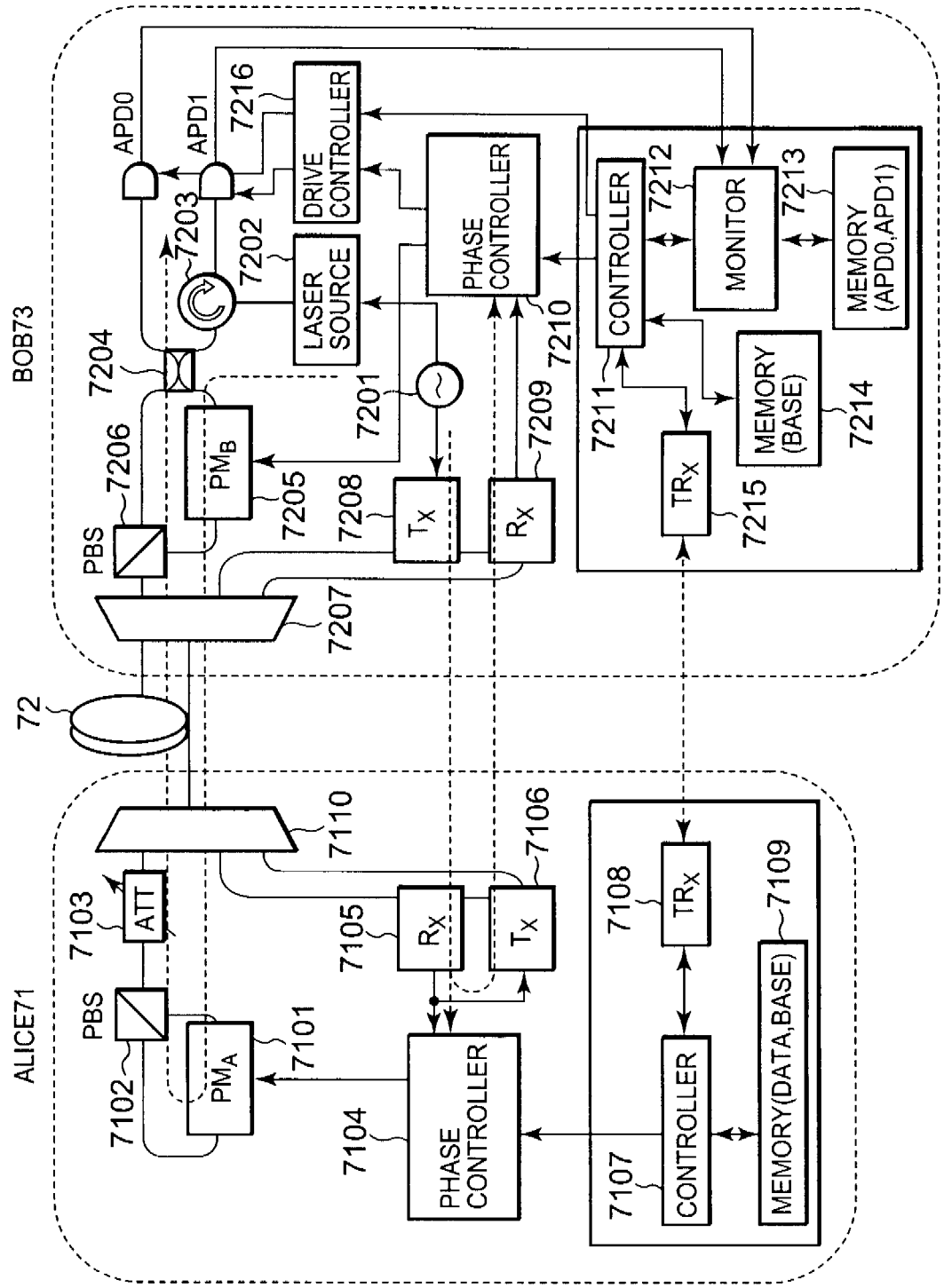
FIG. 23 is a block diagram showing an example of a quantum key distribution system to which one of the embodiments of the present invention is applied.

FIG. 23 is a block diagram showing an example of a quantum key distribution system to which one of the embodiments of the present invention is applied. Here, a configuration of a plug and play quantum key distribution system is shown as an example. In the quantum key distribution system, a sender (Alice) 71 and a receiver (Bob) 73 are connected through an optical fiber transmission line 72. In the present embodiment, wavelength division multiplexing transmission is used, and communications between quantum units, exchanges of reference clock signals, and data communications are carried out by using different wavelengths.

The quantum unit in the sender 71 has a variable optical attenuator 7103 and a PBS loop including a phase modulator 7101 and a polarization beam splitter (PBS) 7102. The phase modulator 7101 performs phase modulation on a sequence of optical pulses passing, in accordance with a phase control signal supplied from a phase controller 7104. There are four depths of phase modulation $(0, \pi/2, \pi, 3\pi/2)$ that respectively correspond to four combinations of a random number indicating a basis (+/x) and a random number (0/1) indicating original data for a key. The phase control signal is any one of drive voltages $V_1$, $V_2$, $V_3$, and $V_4$ corresponding to the depths of phase modulation, respectively. A phase control signal is applied to the phase modulator 7101 at a timing when an optical pulse is passing through the phase modulator 7101, whereby the optical pulse is phase-modulated. The phase controller 7104 applies a phase control signal to the phase modulator 7101 in accordance with a synchronization clock signal received from an optical receiver 7105, and the application timing and applied voltage are controlled by a controller 7107.

The PBS loop has a function similar to a Faraday mirror. Light that has entered the PBS 7102 from the receiver side is outputted, with its polarization state rotated by 90 degrees. The optical signal in the quantum unit, coming from the receiver 73, is passed through the variable optical attenuator 7103, returned by the PBS loop as described above, and then, after passed through the variable optical attenuator 7103, sent out to the receiver 73. The variable optical attenuator 7103 is set for a small amount of attenuation at the time of a training mode for quantum unit synchronization, and is set for a large amount of attenuation at the time of a quantum mode for key generation so that single-photon transmission will be accomplished.

In addition, the sender 71 has two random number generators (not shown), one of which generates original data (0/1) for a cryptographic key, and the other of which generates basis information (+/x). The controller 7107 sequentially stores these generated random numbers in a memory 7109. Bit numbers assigned to the stored random numbers are managed by using the addresses in the memory 7109.

When a key generation flow is started, the controller 7107 increases the amount of attenuation at the variable optical attenuator 7103, sequentially reads a set of original data and a basis from the memory 7109, and outputs them to the phase controller 7104 one by one. The phase controller 7104 outputs a phase control signal corresponding to each set of original data and a basis to the phase modulator 7101 in accordance with the synchronization clock signal, whereby a modulation with any one of the four depths $(0, \pi/2, \pi, 3\pi/2)$ is carried out on an optical pulse passing through the phase modulator 7101.

For the synchronization clock signal supplied to the phase controller 7104, a reference clock signal is used, which is received from the receiver 73 through the optical fiber transmission line 72. The reference clock signal is converted into an electrical signal by an optical receiver 7105 and is outputted to the phase controller 7104. At the same time, this reference clock signal is outputted also to an optical transmitter 7106 and returned to the receiver 73 as a reference clock signal. In addition, the controller 7107 exchanges, via an optical transceiver 7108, data and control signals required for key generation, synchronization processing, calibration processing and the like, with a controller 7211 in the receiver 73.

The quantum unit in the receiver 73 according to the present embodiment has an optical circulator 7203, an optical coupler 7204, a phase modulator 7205, a PBS 7206, and photodetectors APD 0 and APD 1. A long path and a short path are provided in parallel between the optical coupler 7204 and the PBS 7206. The phase modulator 7205 is disposed in the long path, and a depth of phase modulation (basis) and a drive timing are controlled with a phase control signal from a phase controller 7210.

The photodetectors APD 0 and APD 1 are avalanche photodiodes and are driven in the gated Geiger mode by a drive controller 7216, under the control of the phase controller 7210 and controller 7211.

The receiver 73 is provided with a reference clock source 7201. A laser source 7202 is driven in accordance with a reference clock signal generated by the reference clock source 7201. At the same time, this clock signal is outputted to the sender 71 via an optical transmitter 7208. In the sender 71, synchronization timing is determined using this reference clock signal, and the reference clock signal is returned as it is to the receiver 73. The reference clock signal returned from the sender 71 is received by an optical receiver 7209 and supplied to the phase controller 7210 as a synchronization clock signal in the receiver 73. The phase controller 7210, under the control of the controller 7211, controls a depth of phase modulation and a voltage application timing for the phase modulator 7205 on a basis of the supplied reference clock, and controls a timing of applying reverse bias voltage to the photodetectors APD 0 and APD 1 to detect a photon.

Moreover, the receiver 73 has a random number generator (not shown), and the controller 7211 allows the random number generator to generate basis information (+/×) and sequentially stores it in a memory 7214. When a key generation flow is started, the controller 7211 sequentially reads the basis information from the memory 7214 and outputs it to the phase controller 7210. The phase controller 7210 applies a phase control signal, which is a voltage corresponding to the received basis, to the phase modulator 7205 in accordance with the reference clock signal. Thereby, a modulation corresponding to the basis can be carried out on an optical pulse sent from the sender 71 at a timing when the optical pulse is passing through the phase modulator 7205.

As described already, the optical pulse modulated by the phase modulator 7101 in the sender 71 and the optical pulse modulated by the phase modulator 7205 in the receiver 73 interfere with each other at the optical coupler 7204, and a photon is detected by the photodetector APD 0 or APD 1 depending on the difference between the depths of phase modulation given in the sender 71 and given in the receiver 73. Detection signals obtained by the photodetectors APD 0 and APD 1 are sequentially written in a memory 7213 as a raw key. Note that bit numbers assigned to the bits of the raw key written in the memory 7213 and bit numbers assigned to the random numbers as the basis information stored in the memory 7214 are managed by using the addresses in the respective memories. Incidentally, the memories 7213 and 7214 may be different areas in a single memory.

Subsequently, the controller 7107 is notified of the bit numbers assigned to the raw key stored in the memory 7213 and corresponding pieces of the basis information stored in the memory 7214. Random number bits corresponding to unmatching bases are discarded through the above-described basis reconciliation, and as a result, a sifted key is stored in each of the memory 7109 in the sender 71 and the memory 7213 in the receiver 73.

A monitor 7212 in the receiver 73 functions as the random number quality monitor according to the present invention and calculates the mark ratio of random number data such as the raw key or sifted key with a certain length stored in the memory 7213. The controller 7211, phase controller 7210, and drive controller 7216 can be configured such that they will execute any of the DC bias control according to the first or third embodiment, pulse height control according to the fourth embodiment, and gate timing control according to the fifth embodiment, based on the calculated mark ratio.

In addition, it is possible to apply the second embodiment. In the case where a random number generator generating genuine random number is provided to the sender 71, the controller 7107 in the sender 71 assesses the mark ratio of the sifted key stored in the memory 7109. If the mark ratio is out of a desired range, the result of this assessment is notified to the receiver 73 via the optical transceiver 7108. In the receiver 73, based on the result of the assessment received via an optical transceiver 7215, the controller 7211 controls the drive controller 7216 or phase controller 7210, whereby the control of DC bias to the APDs or the like can be executed.

Moreover, in the case of implementing the sixth embodiment, the monitor 7212 in the receiver 73 calculates the number of detections of each state ($N_0$, $N_1$, $N_2$, $N_3$) from the raw key stored in the memory 7213, and the controller 7211 notifies the sender 71, via the transceiver 7108, of information about an unbalance in the states of transmission signal light. The controller 7107 in the sender 71 controls the phase controller 7104 based on the information about an unbalance in the states of transmission signal light received via the transceiver 7108, so that any of the drive voltages $V_0$, $V_1$, $V_2$, and $V_3$ to be applied to the phase modulator 7101 is adjusted in a direction in which the unbalance is eliminated.

Note that although the two-way quantum key distribution system is shown as an example in the present embodiment, the present invention can be similarly applied to a one-way quantum key distribution system.

Eighth Embodiment

In the above-described first to seventh embodiments, the photon detectors, typified by APDs, are used for the photodetectors 0 and 1. However, it is possible to use electrical receivers 0 and 1 as long as their output characteristics are adjustable as in the present invention. For example, the characteristics of 0/1 outputs can be adjusted by changing a threshold value for discriminating an electric signal arriving through a transmission link.

Figure 24:
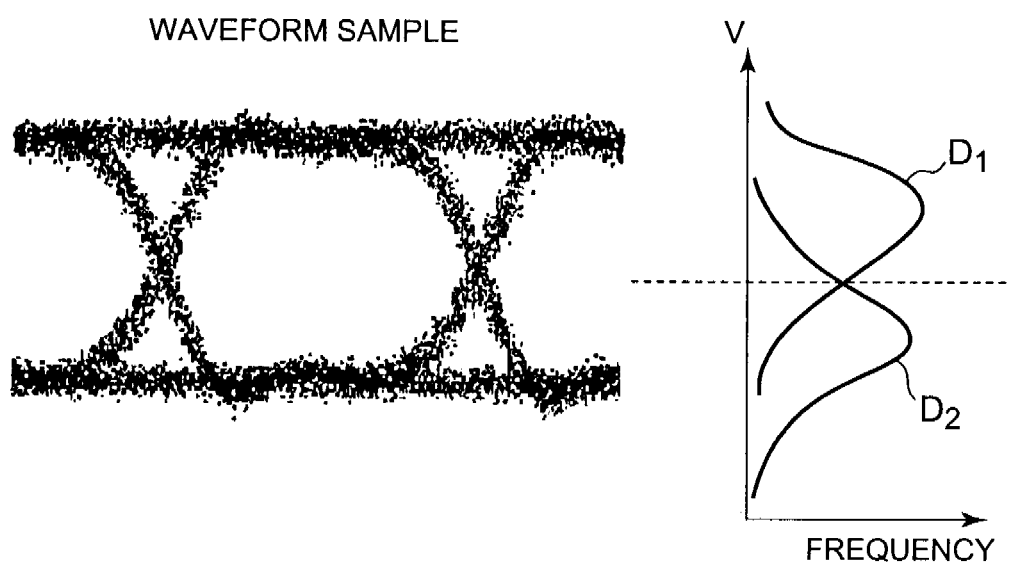
FIG. 24 is a graph showing a relationship between the eye pattern of a received signal and the threshold value $V_{TH}$ for a receiver.

FIG. 24 is a graph showing a relationship between the eye pattern of a received signal and the threshold value $V_{TH}$ for a receiver. Assuming that $D_1$ is a distribution of "1"s and $D_2$ is a distribution of "0"s, a result of discriminating a received signal based on the threshold value $V_{TH}$ is not always correct, but probabilistically each of "0" and "1" can be discriminated as the other value in error at a portion where the distributions $D_1$ and $D_2$ intersect, as the frequency distributions show in FIG. 24. Accordingly, each time a certain quantity of discrimination results is stored, the above-mentioned mark ratio is calculated, and the threshold value $V_{TH}$ is adjusted based on this mark ratio, whereby random numbers with a desired mark ratio can be generated.

The present invention can be applied to random number generation in general and is in particular favorable to the quality control of a cryptographic key for which secrecy is important. For example, the present invention is favorable to the quality control of a cryptographic key generated in quantum key distribution, the security of which is assured in quantum physics. The present invention can be used for a technology of generating random numbers through the detection of very weak light at a single-photon level, typified by the quantum key distribution technologies. Moreover, the quantum key distribution protocol is not limited to BB84, but the present invention is applicable to any of the technologies for distributing a cryptographic key by superposing information on the quantum state of a photon, such as E91, B92, and a method of coding information into a differential phase shift.

The invention claimed is:

1. A receiver of a quantum key distribution system in which a sender and the receiver are connected to each other through a transmission line, the receiver comprising:
   a photodetecting section which receives optical pulses to detect random numbers and separately outputs a plurality of values of the random numbers, wherein the photodetecting section varies in reception efficiency depending on applied bias voltage, wherein the detected random numbers are used for the generation of a quantum key, wherein the photodetecting section comprises a plurality of photodetectors corresponding to the plurality of values;
   a calculating section which calculates a proportion of count of each of the plurality of values of the random numbers detected by the photodetecting section; and a controller which controls a reception efficiency of the photodetecting section so as to bring the proportion closer to a desired value, wherein the controller controls the reception efficiency by independently adjusting respective bias voltages applied to the plurality of photodetectors.

2. The circuit according to claim 1, wherein the photodetecting section detects the plurality of values to output detection signals of the respective values to the calculating section.

3. The circuit according to claim 1, wherein the controller controls the reception efficiency of the photodetecting section such that the respective proportions for the plurality of values are made equal to each other.

4. The circuit according to claim 1, wherein each photodetector receives a signal conveying the random numbers to output a corresponding one of the plurality of values to the calculating section.

5. A random number generator comprising the receiver according to claim 1.

6. A system for receiving by a receiver of a quantum key distribution system in which a sender and the receiver are connected to each other through a transmission line, wherein the receiver comprises:
a photodetector which receives optical pulses to detect a random-number signal from a first communication device through the transmission line to output a plurality of values of received random numbers, wherein the photodetector comprises a plurality of photodetectors each corresponding to the plurality of values, wherein the photodetector varies in reception efficiency depending on applied bias voltage, wherein the detected random numbers are used for the generation of a quantum key;
a random-number quality monitor which monitors the quality of the received random numbers; and
a controller which changes a reception efficiency of the photodetector based on the monitored quality of the received random numbers, wherein the controller controls the reception efficiency by independently adjusting respective bias voltages applied to the plurality of photodetectors.

7. The system according to claim 6, wherein the random-number quality monitor monitors a proportion of count of each of the plurality of values of the received random numbers.

8. The system according to claim 7, wherein the controller controls the reception efficiency of the photodetector so as to reduce a difference between the proportion and a desired value.

9. The system according to claim 8, wherein the desired value is determined such that the respective proportions for the plurality of values are made equal to each other.

10. The system according to claim 6, wherein the controller controls a reception efficiency of the plurality of photodetectors.

11. A receiver of a quantum key distribution system for receiving a random-number signal, the receiver comprising:
a photodetecting section which receives optical pulses to detect the random-number signal to output received random numbers, wherein the photodetecting section comprises a plurality of photodetectors each corresponding to a plurality of values included in the received random numbers, wherein the photodetecting section varies in reception efficiency depending on applied bias voltage, wherein the detected random numbers are used for the generation of a quantum key;
a random-number quality monitor which monitors quality of the received random numbers; and
a controller which changes a reception efficiency of the photodetecting section based on the monitored quality of the received random numbers, wherein the controller controls the reception efficiency by independently adjusting respective bias voltages applied to the plurality of photodetectors.

12. The receiver according to claim 11, wherein the random-number quality monitor monitors a proportion of count of each of the plurality of values.

13. The receiver according to claim 12, wherein the controller controls the reception efficiency of the photodetecting section so as to reduce a difference between the proportion and a desired value.

14. The receiver according to claim 13, wherein the desired value is determined such that the respective proportions for the plurality of values are made equal to each other.

15. The receiver according to claim 11, wherein each of the photodetectors varies in reception efficiency depending on an applied voltage, wherein the controller controls the applied voltage based on the monitored quality of the received random numbers.

16. The receiver according to claim 15, wherein the applied voltage is a bias voltage applied to the photodetector.

17. The receiver according to claim 15, wherein the applied voltage is a pulse height of voltage pulses applied to the photodetector.

18. The receiver according to claim 11, wherein each of the photodetectors varies in reception efficiency depending on a reception timing of the random-number signal and a timing of applying a pulse-like voltage to the photo detector, wherein the controller controls the timing of applying the pulse-like voltage based on the monitored quality of the received random numbers.

19. The receiver according to claim 11, wherein each of the photodetectors varies in reception efficiency depending on a threshold which is used to discriminate the detected random-number signal, wherein the controller controls the threshold based on the monitored quality of the received random numbers.

20. A method for receiving in a quantum key distribution system in which a sender and a receiver are connected to each other through a transmission line, the method comprising:
receiving, by one of two communication devices, optical pulses to detect random numbers to separately output a plurality of values of the random numbers according to independent reception efficiencies for respective ones of the plurality of values, wherein the one of the two communication devices varies in reception efficiency depending on applied bias voltage, wherein the detected random numbers are used for the generation of a quantum key, wherein the one of the two communication devices comprises a plurality of photodetectors corresponding to the plurality of values;
storing, by a memory device, a predetermined amount of received random numbers;
generating, by the one of the two communication devices, a proportion of count of each of the plurality of values in the predetermined amount of received random numbers; and
independently changing the independent reception efficiencies, by the one of the two communication devices, so as to bring the proportion closer to a desired value, wherein the one of the two communication devices controls the reception efficiency by independently adjusting respective bias voltages applied to the plurality of photodetectors.

21. The method according to claim 20, wherein the independent reception efficiencies are controlled such that the respective proportions for the plurality of values are made equal to each other.

22. A random number generator performing a method according to claim 20.

23. A method for receiving in a quantum key distribution system in which a sender and a receiver are connected to each other through a transmission line, the method comprising:
- transmitting, by a first communication device, a random-number signal to a second communication device;
- sharing random numbers between the first communication device and the second communication device based on the random-number signal;
- receiving, by the second communication device, which includes a photodetecting section comprising a plurality of photodetectors each corresponding to the plurality of values, optical pulses to detect the random-number signal to output received random numbers, wherein the photodetecting section varies in reception efficiency depending on applied bias voltage, wherein the detected random numbers are used for the generation of a quantum key, wherein the photodetecting comprises a plurality of photodetectors corresponding to the plurality of values;
- monitoring, by a random number quality monitor, the quality of the received random numbers; and
- changing, by a reception efficiency changing device, a reception efficiency of the photodetecting section based on the monitored quality of the received random numbers, wherein the reception efficiency is changed by independently adjusting respective bias voltages applied to the plurality of photodetectors.

24. The method according to claim 23, wherein the quality of the received random numbers is a proportion of count of each of the plurality of values.

25. The method according to claim 24, wherein the reception efficiency of the photodetecting section is changed so as to reduce a difference between the proportion and a desired value.

26. The method according to claim 25, wherein the desired value is determined such that the respective proportions for the plurality of values are made equal to each other.

27. A quantum key distribution system performing a method according to claim 23.

28. A method for receiving in a quantum key distribution system in which a sender and the receiver are connected through a transmission line, the method comprising:
- receiving, at a photodetecting section, optical pulses to detect the random-number signal to output received random numbers, the photodetecting section comprising a plurality of photodetectors each corresponding to a plurality of values included in the received random numbers, wherein a reception efficiency varies depending on applied bias voltage, wherein the detected random numbers are used for the generation of a quantum key;
- monitoring, by a random number quality monitor, quality of the received random numbers obtained from the detected random-number signal; and
- changing, by a reception efficiency changing device, the reception efficiency of the photodetecting section based on the monitored quality of the received random numbers, wherein the reception efficiency is changed by independently adjusting respective bias voltages applied to the plurality of photodetectors.

29. The method according to claim 28, wherein the quality of the received random numbers is a proportion of count of each of the plurality of values.

30. The method according to claim 29, wherein the reception efficiency of the photodetecting section is controlled so as to reduce a difference between the proportion and a desired value.

31. The method according to claim 30, wherein the desired value is determined such that the respective proportions for the plurality of values are made equal to each other.

32. A non-transitory computer-readable storage medium storing a program containing instructions for instructing a computer to execute operations to receive in a quantum key distribution system, the operations comprising:
- receiving, at a photodetecting section, optical pulses to detect random numbers to separately output a plurality of values according to independent reception efficiencies for respective ones of the plurality of values, wherein the reception efficiencies vary depending on applied bias voltage, wherein detected random numbers are used for the generation of a quantum key, wherein the photodetecting section comprises a plurality of photodetectors corresponding to the plurality of values;
- storing a predetermined amount of received random numbers in a memory;
- generating a proportion of count of each of the plurality of values in the predetermined amount of received random numbers; and
- independently changing the independent reception efficiencies so as to bring the proportion closer to a desired value, wherein the reception efficiency is changed by independently adjusting respective bias voltages applied to the plurality of photodetectors.

33. A non-transitory computer-readable storage medium storing a program containing instructions for instructing a computer to execute operations to receiving in a quantum key distribution system through a transmission line, the operations comprising:
- receiving optical pulses to detect a random-number signal to output received random numbers at a photodetecting section which comprises a plurality of photodetectors each corresponding to a plurality of values included in the received random numbers, wherein reception efficiencies vary depending on applied bias voltage, wherein the received random numbers are used for the generation of a quantum key;
- monitoring quality of the received random numbers obtained from the detected random-number signal; and
- changing a reception efficiency of the photodetecting section based on the monitored quality of the received random numbers, wherein the reception efficiency is changed by independently adjusting respective bias voltages applied to the plurality of photodetectors.

* * * * *